US012676955B2

(12) United States Patent
Matsumoto et al.

(10) Patent No.: US 12,676,955 B2
(45) Date of Patent: Jul. 7, 2026

(54) ELECTRONIC MIRROR SYSTEM, IMAGING DEVICE, AND ELECTRONIC MIRROR

(71) Applicant: Panasonic Intellectual Property Management Co., Ltd., Osaka (JP)

(72) Inventors: Yasutaka Matsumoto, Tokyo (JP); Yoshimasa Niibo, Kanagawa-Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 58 days.

(21) Appl. No.: 18/306,741

(22) Filed: Apr. 25, 2023

(65) Prior Publication Data

US 2023/0269366 A1 Aug. 24, 2023

Related U.S. Application Data

(63) Continuation of application No. PCT/JP2021/040309, filed on Nov. 1, 2021.

(30) Foreign Application Priority Data

Jan. 20, 2021 (JP) .................................. 2021-007393

(51) Int. Cl.
H04N 5/268 (2006.01)
B60R 1/12 (2006.01)
(Continued)

(52) U.S. Cl.
CPC ............. *H04N 17/002* (2013.01); *B60R 1/12* (2013.01); *B60R 1/22* (2022.01); *G08B 21/187* (2013.01);
(Continued)

(58) Field of Classification Search
CPC ........ H04N 17/002; H04N 5/268; H04N 7/18; H04N 23/60; B60R 1/12; B60R 1/22;
(Continued)

(56) References Cited

U.S. PATENT DOCUMENTS

| | | | |
|---|---|---|---|
| 2010/0208074 A1* | 8/2010 | Hattori .................. | B60K 28/10 348/148 |
| 2013/0265431 A1 | 10/2013 | Hattori et al. | |
| 2015/0033357 A1 | 1/2015 | Habel et al. | |
| 2017/0313252 A1* | 11/2017 | Uchimura ................ | B60R 1/12 |

(Continued)

FOREIGN PATENT DOCUMENTS

| | | | |
|---|---|---|---|
| JP | 2003174581 A | * | 6/2003 |
| JP | 2010188903 A | | 9/2010 |

(Continued)

OTHER PUBLICATIONS

English Translation of International Search Report, mailed Jan. 18, 2022, for International Patent Application No. PCT/JP2021/040309. (2 pages).

*Primary Examiner* — Jamie J Atala
*Assistant Examiner* — Mahmoud Kamal Abouzahra
(74) *Attorney, Agent, or Firm* — Seed Intellectual Property Law Group LLP

(57) ABSTRACT

An electronic mirror system according to one embodiment of the present disclosure includes a first imaging device and an electronic mirror. The first imaging device acquires an image. The electronic mirror can display the image acquired by the first imaging device. The first imaging device includes a detector and a notifier. The detector detects a failure. The notifier notifies the electronic mirror of the detected failure. The electronic mirror includes an annunciator. The annunciator announces information on the notified failure.

15 Claims, 15 Drawing Sheets

(51) Int. Cl.

| | |
|---|---|
| *B60R 1/22* | (2022.01) |
| *G08B 21/18* | (2006.01) |
| *H04N 17/00* | (2006.01) |
| *G02F 1/137* | (2006.01) |
| *G02F 1/163* | (2006.01) |

(52) U.S. Cl.
CPC ...... *H04N 5/268* (2013.01); *B60R 2001/1253* (2013.01); *B60R 2300/8046* (2013.01); *G02F 1/137* (2013.01); *G02F 1/163* (2013.01)

(58) Field of Classification Search
CPC .... B60R 2001/1253; B60R 2300/8046; B60R 1/20; B60R 1/00; B60R 16/02; G08B 21/187; G02F 1/137; G02F 1/163
USPC ........................................................ 348/148
See application file for complete search history.

(56) References Cited

U.S. PATENT DOCUMENTS

| | | | | |
|---|---|---|---|---|
| 2019/0061628 A1* | 2/2019 | Kanagaraj | ................. | B60R 1/12 |
| 2019/0073278 A1* | 3/2019 | Ikeda | ....................... | G06T 9/007 |
| 2019/0149813 A1* | 5/2019 | Sun | ........................ | G03B 43/00 |
| | | | | 348/187 |
| 2019/0349394 A1 | 11/2019 | Kishikawa et al. | | |
| 2021/0385244 A1 | 12/2021 | Kishikawa et al. | | |

FOREIGN PATENT DOCUMENTS

| | | | | | |
|---|---|---|---|---|---|
| JP | 2015511905 A | | 4/2015 | | |
| KR | 102093702 B1 * | | 3/2020 | ............... | F16H 1/16 |
| WO | WO 2016056208 A1 | | 4/2016 | | |
| WO | WO-2016169910 A1 * | | 10/2016 | ............... | B60R 1/26 |
| WO | WO 2019107210 A1 | | 6/2019 | | |

\* cited by examiner

| FAILURE IDENTIFIER | FAILURE MODE | ADDRESS IN REGISTER 114a | ADDRESS IN REGISTER 123a |
|---|---|---|---|
| FM1 | FRAME RATE DROP | AD101 | AD201 |
| FM2 | VIDEO TRANSMISSION DELAY ABNORMALITY | AD102 | AD202 |
| FM6 | SENSITIVITY ABNORMALITY | AD106 | AD206 |
| FM7 | DYNAMIC RANGE ABNORMALITY | AD107 | AD207 |
| FM8 | LINEARITY ABNORMALITY | AD108 | AD208 |
| FM13 | DISPLAY POSITION DEVIATION | AD113 | AD213 |
| FM14 | IMAGE STICKING | AD114 | AD214 |
| FM15 | LEFT-RIGHT INVERSION ABNORMALITY | AD115 | AD215 |

FIG.5

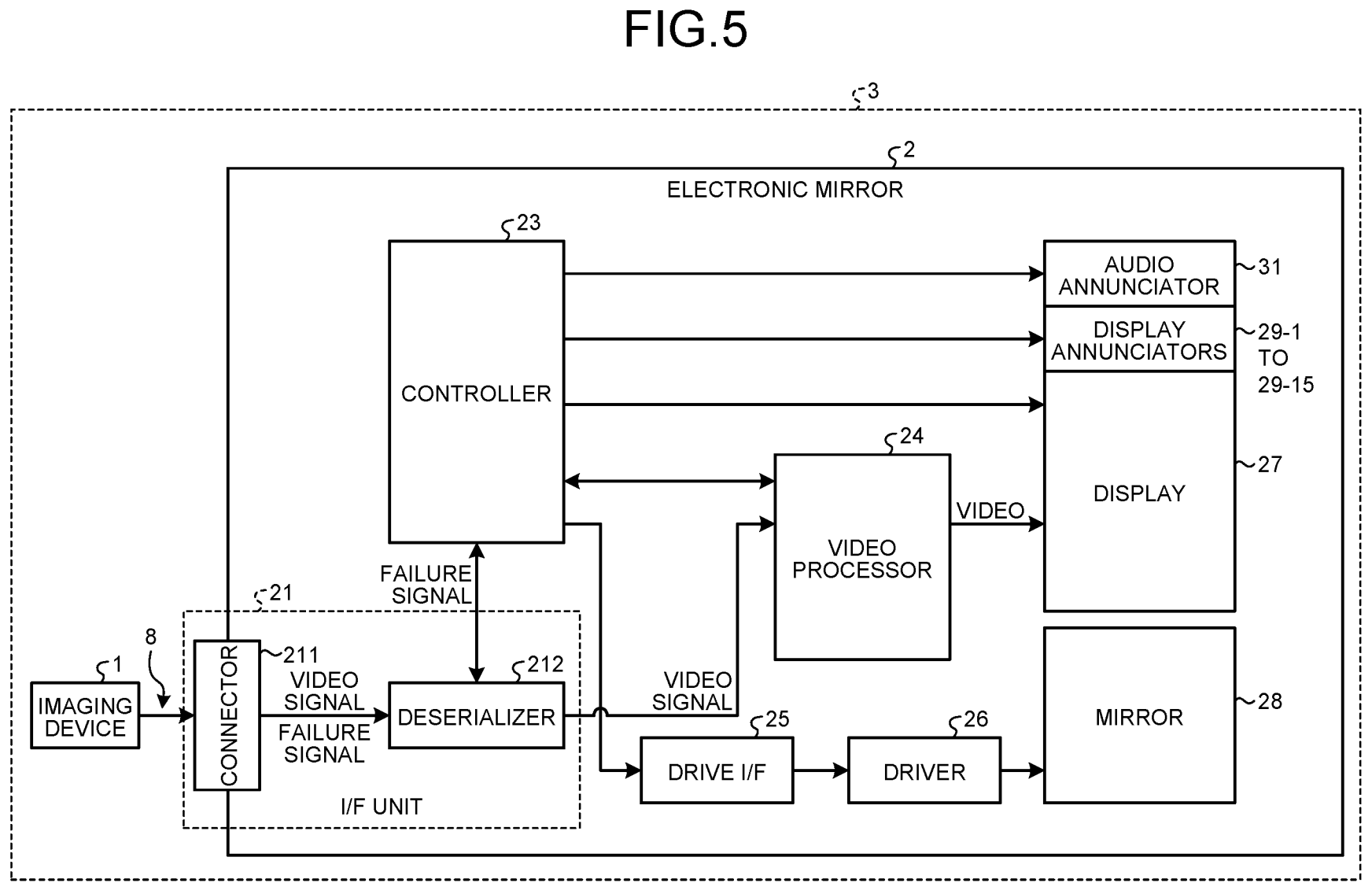

ELECTRONIC MIRROR

AUDIO ANNUNCIATOR 31

DISPLAY ANNUNCIATORS 29-1 TO 29-15

DISPLAY 27

MIRROR 28

VIDEO PROCESSOR 24

DRIVER 26

DRIVE I/F 25

CONTROLLER 23

DESERIALIZER 212

CONNECTOR 21

VIDEO SIGNAL 211

FAILURE SIGNAL

I/F UNIT

IMAGING DEVICE 1

VIDEO

VIDEO SIGNAL

FAILURE SIGNAL

Figure 7:
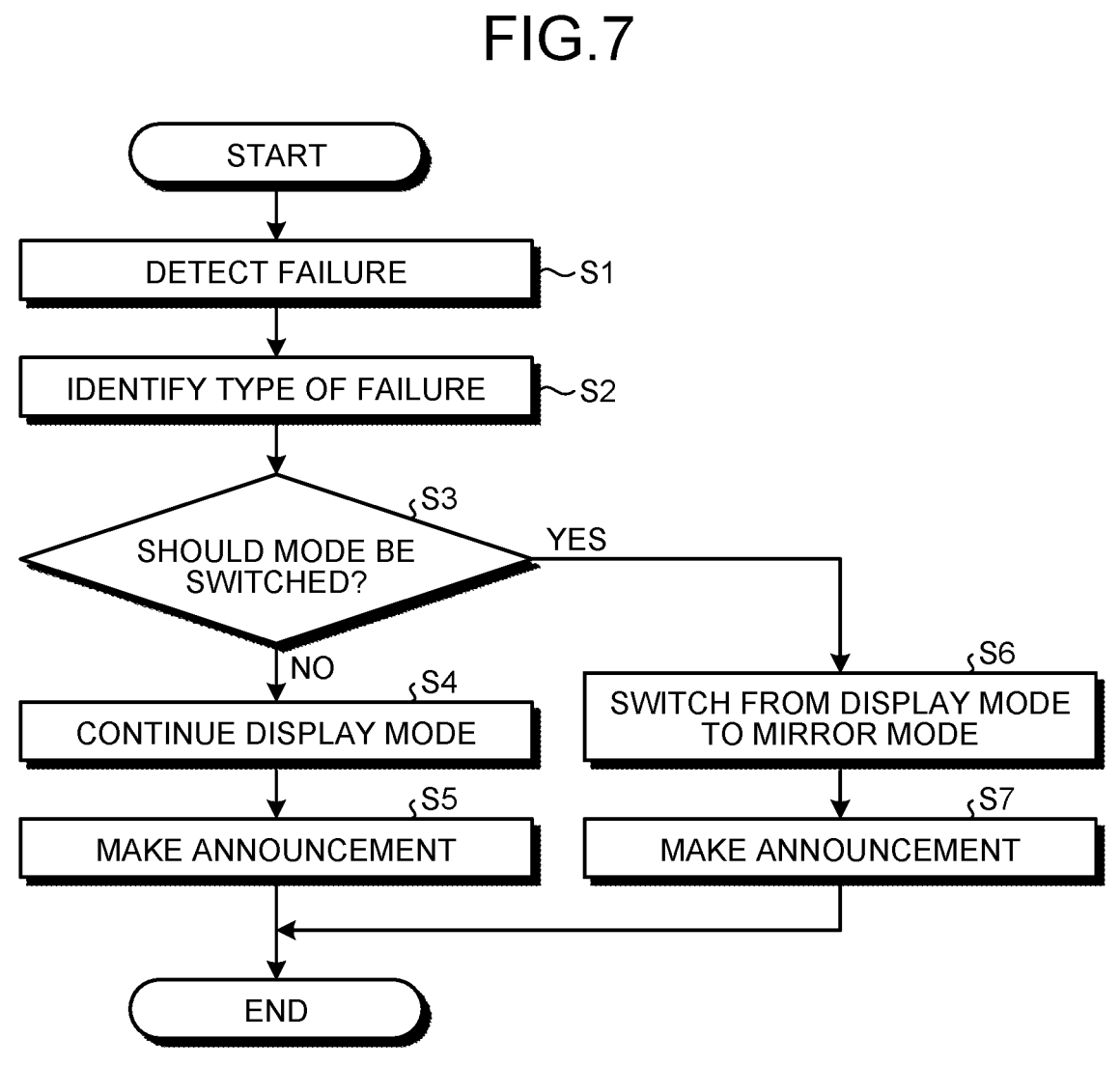

```
        START

│
         ▼
   DETECT FAILURE        ~S1

│
         ▼
 IDENTIFY TYPE OF FAILURE   ~S2

│
         ▼
      ╱S3
   SHOULD MODE BE  ──── YES ────┐
    SWITCHED?                   │
      │ NO                      ▼
      │   ╱S4                       ╱S6
 CONTINUE DISPLAY MODE     SWITCH FROM DISPLAY MODE
                                TO MIRROR MODE
      │                          │
      ▼   ╱S5                     ▼   ╱S7
 MAKE ANNOUNCEMENT          MAKE ANNOUNCEMENT

│                          │
      ▼◄─────────────────────────┘

END
```

FIG.13

ELECTRONIC MIRROR SYSTEM, IMAGING DEVICE, AND ELECTRONIC MIRROR

CROSS-REFERENCE TO RELATED APPLICATIONS

This application is a continuation of International Application No. PCT/JP2021/040309, filed on Nov. 1, 2021 which claims the benefit of priority of the prior Japanese Patent Application No. 2021-007393, filed on Jan. 20, 2021, the entire contents of which are incorporated herein by reference.

FIELD

Embodiments described herein relate generally to an electronic mirror system, an imaging device, and an electronic mirror.

BACKGROUND

In recent years, as vehicle driver assistance systems have become more popular, imaging devices are increasingly being mounted on vehicles. The related technologies are described, for example, in International Application Publication No. WO2019/107210 and Japanese Translation of PCT International Application Publication No. 2015-511905.

The present disclosure provides an electronic mirror system, an imaging device, and an electronic mirror, which can easily improve convenience.

SUMMARY

According to one aspect of the present disclosure, an electronic mirror system includes a first imaging device and an electronic mirror. The first imaging device acquires an image. The electronic mirror can display the image acquired by the first imaging device. The first imaging device includes a detector and a notifier. The detector detects a failure. The notifier notifies the electronic mirror of the detected failure. The electronic mirror includes an annunciator. The annunciator announces information on the notified failure.

BRIEF DESCRIPTION OF THE DRAWINGS

FIG. 3 is a diagram illustrating a configuration of an imaging device in the first embodiment;

FIG. 4 is a chart illustrating types of failures detected in the imaging device in the first embodiment;

FIG. 5 is a diagram illustrating a configuration of an electronic mirror in the first embodiment;

FIG. 7 is a flowchart illustrating an operation of the electronic mirror system in the second embodiment;

FIG. 13 is a diagram illustrating a configuration of the electronic mirror in the sixth embodiment;

DETAILED DESCRIPTION

Figure 1:
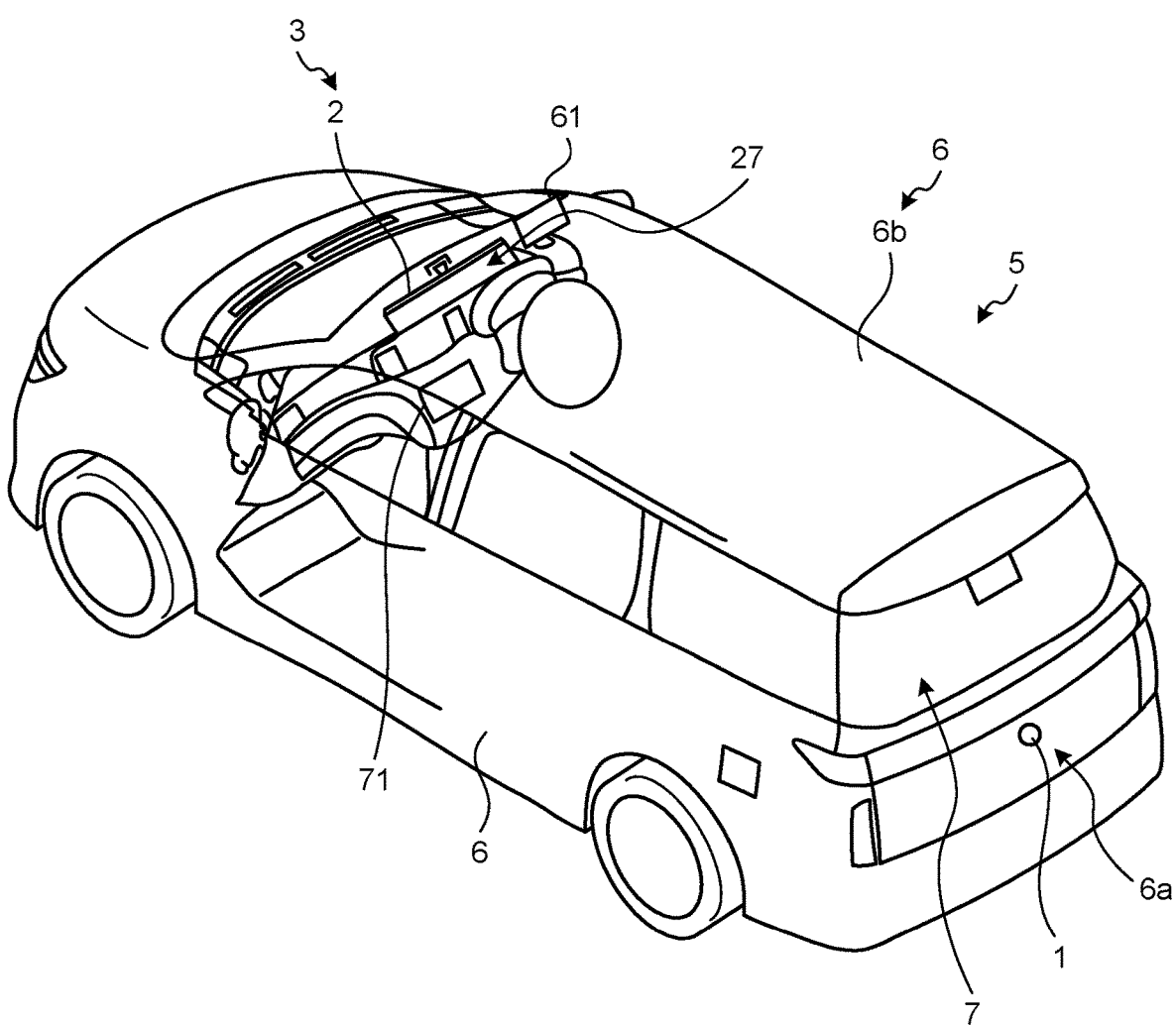
FIG. 1 is a view illustrating a vehicle on which an electronic mirror system according to a first embodiment is mounted.

The following describes embodiments of an electronic mirror system according to the present disclosure with reference to the drawings.

First Embodiment

The electronic mirror system according to a first embodiment includes an imaging device (in-vehicle camera) mounted on a vehicle, and can be used for assisting driving of the vehicle. The imaging device for assisting vehicle driving plays a main role in a vehicle driver assistance system, for example, detecting objects such as vehicles, pedestrians, and obstacles, giving warnings to a driver, and forcing the vehicle to stop, through image processing using an internal image signal processor (ISP).

The vehicle may be provided with an electronic mirror together with the imaging device, and the electronic mirror system may be configured including the imaging device and the electronic mirror. The electronic mirror displays an image of surroundings of the vehicle captured by the imaging device in place of a mirror for viewing the surroundings of the vehicle (for example, the rear of the vehicle).

For example, in the electronic mirror system, a failure of the imaging device may occur, and thus, the electronic mirror may not properly display the image of the surroundings of the vehicle. However, it is difficult for a user to determine whether the imaging device has failed by viewing the image displayed on the electronic mirror. That is, the failure of the imaging device is difficult to be found unless the user asks a professional to perform a detailed inspection, and, in the first place, unless the user is aware of the occurrence of the failure, the professional is not asked for the inspection. As a result, the failure of the imaging device may be left unattended after having occurred.

If the failure of the imaging device is left unattended, the electronic mirror system may not operate properly, and the convenience thereof may be impaired.

Therefore, in the present embodiment, the imaging device in the electronic mirror system detects the failure of the imaging device and notifies the electronic mirror of the failure, and the electronic mirror announces a failure signal regarding the notified failure to the user, thereby improving the convenience.

Specifically, the electronic mirror system is mounted on the vehicle and includes the imaging device and the electronic mirror. The imaging device includes an image sensor and a signal processor. The imaging device acquires the image using the image sensor, processes a signal corresponding to the acquired image using the signal processor (ISP), and outputs the result to the electronic mirror. The electronic mirror can display the image acquired by the imaging device on a display portion. This configuration allows the electronic mirror to display the image of the surroundings of the vehicle captured by the imaging device, and operate as an alternative to a mirror. At this time, the imaging device detects the failure of the image sensor and/or the signal processor, and holds information on the detected failure. The imaging device notifies the electronic mirror of the failure upon request from the electronic mirror or autonomously. The electronic mirror announces the information on the failure of the imaging device according to the notified failure. The electronic mirror may announce the information on the failure of the imaging device by audio and/or display. This operation can prompt the user to respond to the occurrence of the failure of the imaging device, and thus, can allow the user to, for example, ask an expert to repair the imaging device. As a result, the failure of the imaging device can be restrained from being left unattended, and the electronic mirror system can return to the properly operating state, so that the convenience of the electronic mirror system can be improved.

More specifically, an electronic mirror system 3 can be mounted on a vehicle 5, as illustrated in FIG. 1. FIG. 1 is a view illustrating the vehicle 5 on which the electronic mirror system 3 is mounted. The electronic mirror system 3 includes an imaging device 1 and an electronic mirror 2.

The imaging device 1 is an in-vehicle camera mounted on the vehicle 5, and is installed outside or inside a vehicle body 6. The imaging device 1 may be installed at the rear end of the vehicle body 6 to be applied to an electronic rear-view mirror, at an end near a door of the vehicle body 6 to be applied to an electronic side-view mirror, or at the front end of the vehicle body 6 to be applied to an electronic front-view mirror.

The electronic mirror 2 is located in a vehicle interior 7. The electronic mirror 2 includes a display 27 on a surface facing the vehicle interior 7, and can display the image acquired by the imaging device 1 on the display 27. If the electronic mirror 2 is the electronic rear-view mirror, it may be implemented in the form of a room mirror, and the display 27 may have the shape of the mirror surface of the room mirror. If the electronic mirror 2 is the electronic side-view mirror, it may be implemented in the form of a door mirror (for example, a door mirror 61), and the display 27 may have the shape of the mirror surface of the door mirror. If the electronic mirror 2 is the electronic front-view mirror, it may be implemented in the form of an in-vehicle display device (for example, a display device 71), and the display 27 may have the shape of the display portion of the display device.

FIG. 1 illustrates a configuration in which the imaging device 1 is installed at a rear end 6a of the vehicle body 6, and the electronic mirror 2 is applied to the electronic rear-view mirror. The electronic rear-view mirror is also called "electronic room mirror". The imaging device 1 acquires an image on the rear side of the vehicle body. The electronic mirror 2 can display the image on the rear side of the vehicle body captured by the imaging device 1.

Figure 2:
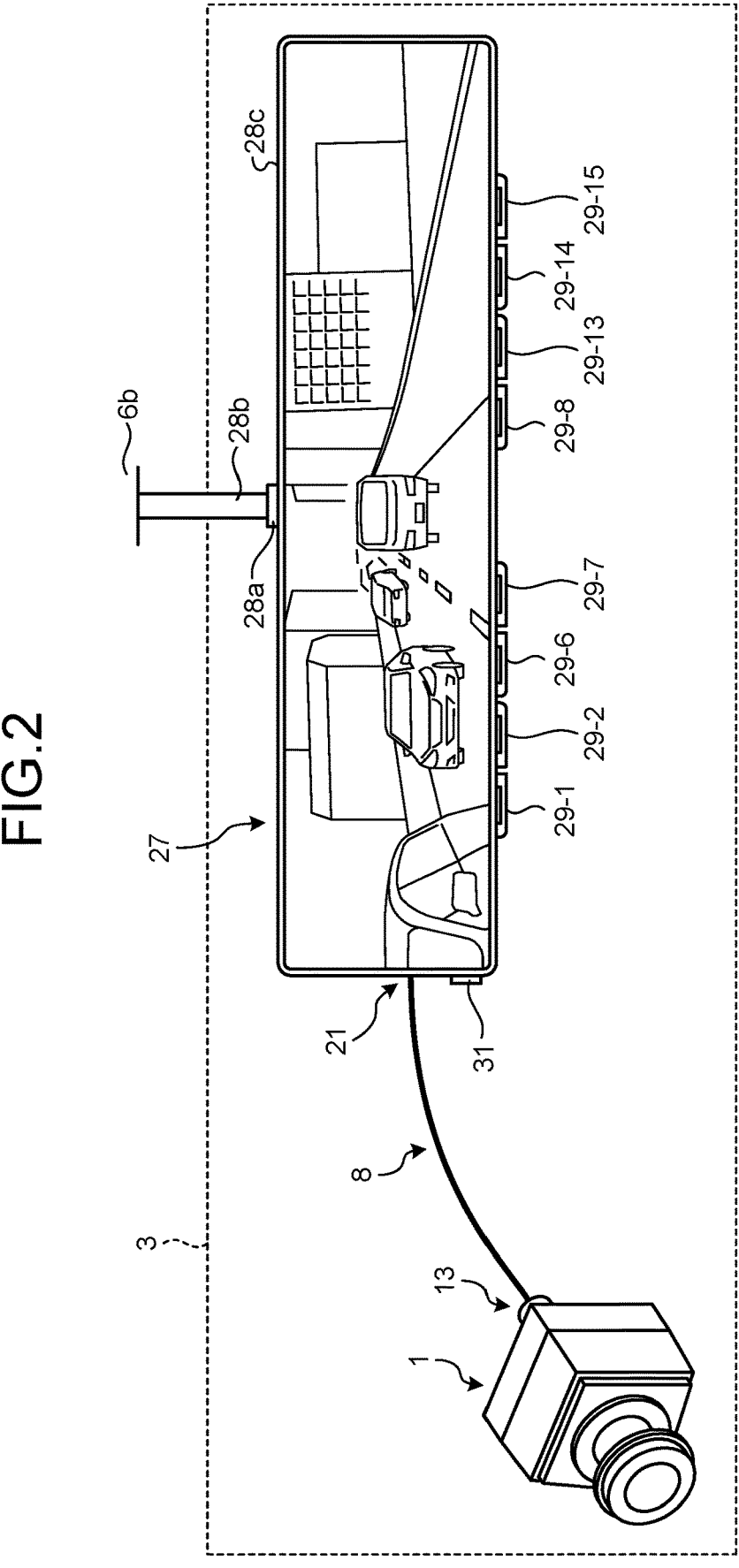
FIG. 2 is a view illustrating a configuration of the electronic mirror system according to the first embodiment.

In the electronic mirror system 3, the imaging device 1 and the electronic mirror 2 are communicably connected to each other via a communication medium 8, as illustrated in FIG. 2. FIG. 2 is a view illustrating a configuration of the electronic mirror system 3. The communication medium 8 may be a communication cable such as a serial cable or a wireless communication line such as Bluetooth (registered trademark). FIG. 2 illustrates a configuration in which the communication medium 8 is the communication cable, and one end of the communication medium 8 is connected to an interface (I/F) unit 13 of the imaging device 1 and the other end of the communication medium 8 is connected to an I/F unit 21 of the electronic mirror 2.

The imaging device 1 captures the surroundings of the vehicle body 6, and supplies the acquired image to the electronic mirror 2 via the communication medium 8. In response to this operation, the electronic mirror 2 receives the image captured by the imaging device 1, and may display the received image as it is on the display 27, or may cut out a partial image from the received image and display it on the display 27. FIG. 2 illustrates a configuration in which the partial image cut out from the image captured by the imaging device 1 into the shape of the mirror surface of the room mirror is displayed on the display 27 of the electronic mirror 2. A housing 28c of the electronic mirror 2 may be fixed to the inside of a roof 6b of the vehicle body 6 in the state where the attitude of the housing 28c is variable. The housing 28c of the electronic mirror 2 may be fixed to the roof 6b of the vehicle body 6 with a rotating portion 28a and a supporting portion 28b interposed therebetween. As the attitude of the housing 28c changes, the electronic mirror 2 may finely adjust the position of the partial image to be cut out from the overall image, and cut out and display the partial image on the display 27. This operation allows the electronic mirror 2 to display the image of the surroundings of the vehicle captured by the imaging device 1 according to the attitude of the housing 28c of the electronic mirror 2, and can operate as an alternative to the mirror.

Figure 3:
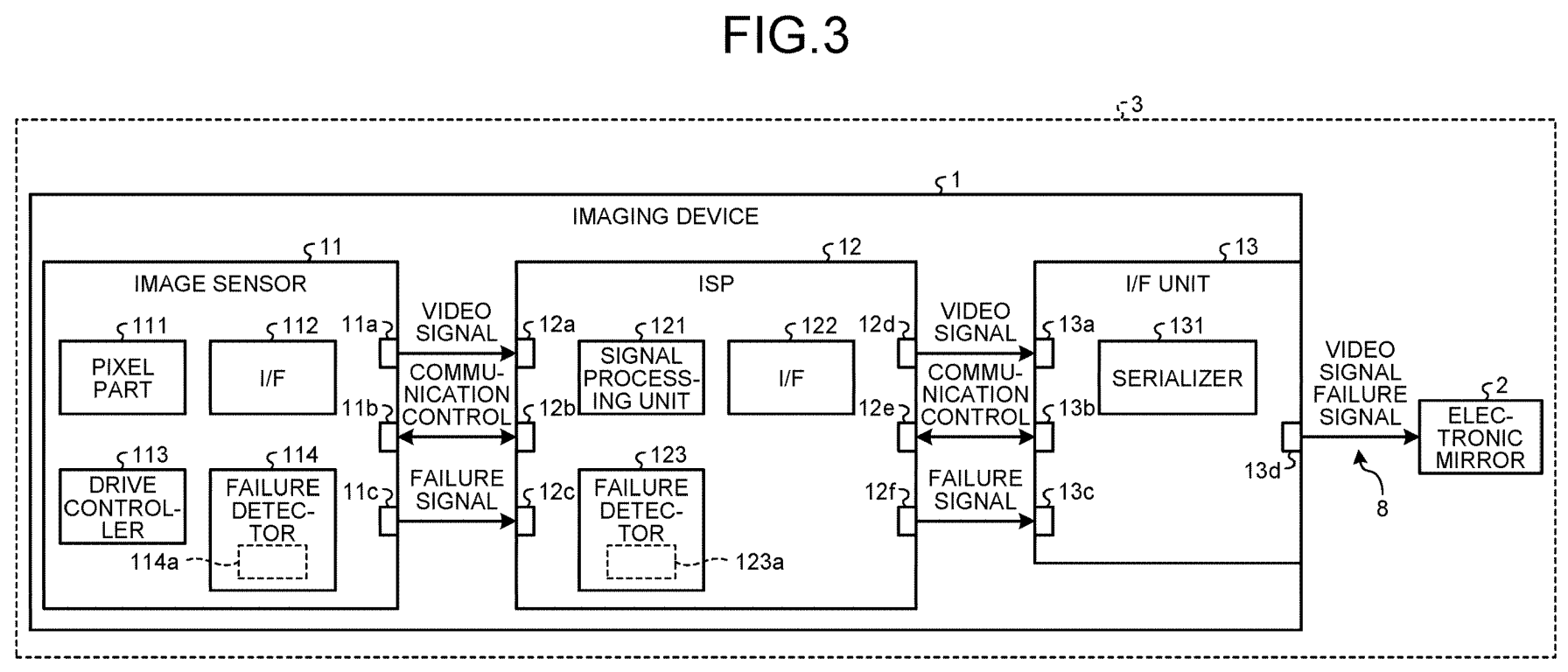

As illustrated in FIG. 3, the imaging device 1 includes an image sensor 11, a signal processor (image signal processor (ISP)) 12, and the interface (I/F) unit 13. FIG. 3 is a diagram illustrating a configuration of the imaging device 1. The image sensor 11 includes terminals 11a to 11c. The signal processor 12 includes terminals 12a to 12f. The interface unit 13 includes terminals 13a to 13d.

The image sensor 11 acquires the image around the vehicle 5 (for example, behind the vehicle 5), generates a plurality of pixel signals corresponding to the acquired image, and supplies the pixel signals to the signal processor 12. At the same time, the image sensor 11 detects a failure of the image sensor 11, and holds information on the detected failure. The image sensor 11 notifies the electronic mirror 2 of the failure of the image sensor 11 via the signal processor 12 and the interface unit 13 upon request from the electronic mirror 2 or autonomously.

The image sensor 11 includes a pixel part 111, an interface (I/F) 112, a drive controller 113, and a failure detector 114. In the pixel part 111, a plurality of pixels are arranged so as to form a plurality of rows and a plurality of columns, and a plurality of analog-to-digital (AD) converters (ADCs) are arranged correspondingly to the columns. The pixel part 111 uses the pixels to perform a charge accumulation operation according to a subject image (image) formed on the imaging surface of the pixel part 111, and generates the pixel signals by causing the AD converters to perform AD conversion on the accumulated signals of the pixels on a column-by-column basis. The drive controller 113 includes a vertical scan circuit and a horizontal scan circuit. The vertical scan circuit scans the pixels in the vertical direction in response to vertical drive signals (VD), and drives control of, for example, the charge accumulation operation of the pixels on a row-by-row basis. The horizontal scan circuit scans the pixels in the horizontal direction in response to horizontal drive signals (HD), and drives reading of the pixel signals from the pixels and the AD conversion of the pixel signals on a column-by-column basis.

The interface 112 exchanges communication control information with the signal processor 12 via the terminals 11*b* and 12*b* to establish communication with the signal processor 12. The interface 112 may establish the communication with the signal processor 12 according to the Serial Peripheral Interface (SPI) protocol. The interface 112 transmits the pixel signals output from the pixel part 111 as one frame image to the signal processor 12 via the terminals 11*a* and 12*a*. The interface 112 can transmit a plurality of temporally continuous frame images as a video signal to the signal processor 12 via the terminals 11*a* and 12*a*.

The failure detector 114 detects the failure of the image sensor 11. The failure detector 114 may periodically detect the failure of the image sensor 11, may detect the failure of the image sensor 11 upon request from the electronic mirror 2, or may detect the failure of the image sensor 11 upon request from an electronic control unit (ECU) (not illustrated) that integrally controls the vehicle 5. The failure detector 114 includes a register 114*a*, and holds the information on the detected failure in the register 114*a*. As illustrated in FIG. 4, the failure detector 114 further detects the type of the failure of the image sensor 11, identifies the failure mode according to the type of the detected failure, and stores information indicating the failure mode in the register 114*a*. FIG. 4 is a chart illustrating the types of the failures detected in the imaging device 1.

Suppose that a plurality of failure modes are present with different types of failures, a plurality of failure identifiers FM1 to FM15 corresponding to the failure modes are defined in advance, and a plurality of addresses AD101 to AD115 corresponding to the failure identifiers FM1 to FM15 are reserved in the register 114*a*. The failure identifiers FM1, FM2, FM6, FM7, FM8, FM13, FM14, and FM15 correspond to the failure modes "frame rate drop", "video transmission delay abnormality", "sensitivity abnormality", "dynamic range abnormality", "linearity abnormality", "display position deviation", "image sticking", and "left-right inversion abnormality", respectively. The failure identifiers FM1, FM2, FM6, FM7, FM8, FM13, FM14, and FM15 correspond to the addresses AD101, AD102, AD106, AD107, AD108, AD113, AD114, and AD115, respectively, in the register 114*a*.

The failure mode "frame rate drop" is a failure in which the frame rate of the video signal displayed on the display 27 of the electronic mirror 2 drops below a threshold, indicating a phenomenon in which the temporal change of a video displayed on the display 27 is made non-smooth. The failure mode "video transmission delay abnormality" is a failure in which the delay in transmission of the video signal in the imaging device 1 exceeds a threshold, indicating a phenomenon in which a temporally past image is displayed on the display 27. The failure mode "sensitivity abnormality" is a failure in which the sensitivity of the imaging by the imaging device 1 is out of an allowable range. The failure mode "dynamic range abnormality" is a failure in which the dynamic range of the signal by the imaging device 1 decreases to be smaller than a threshold. The "linearity abnormality" is a failure in which the linearity of the imaging by the imaging device 1 decreases to be smaller than a threshold. The "display position deviation" is a failure in which the position of the subject in the image acquired by the imaging device 1 deviates from an actual position. The "image sticking" is a failure in which the image acquired by the imaging device 1 is stuck and remains almost unchanged. The "left-right inversion abnormality" is a failure in which the subject in the image acquired by the imaging device 1 is horizontally flipped from the actual subject.

The failure detector 114 includes a VD counter, a frame counter, and an internal clock monitor. The VD counter counts a time interval between each of the vertical drive signals (VD) and the next vertical drive signal (VD). The failure detector 114 can obtain the temporal length of one frame period from the count value of the VD counter. The frame counter counts the number of frame synchronization signals. The failure detector 114 can obtain the frame rate, for example, by dividing the counted time by the count value of the frame counter. The internal clock monitor counts the number of clocks of an internal clock used for the signal transmission performed by the interface 112. The failure detector 114 can obtain the period of the internal clock, for example, by dividing the counted time by the count value of the internal clock monitor, and obtain the transmission rate of the signal transmitted by the interface 112 according to the number of bits of the transmitted signal and the period of the internal clock.

The failure detector 114 compares the frame rate with a threshold THfr according to the temporal length of one frame period or the frame rate that has been obtained. If the frame rate is lower than the threshold THfr, the failure detector 114 regards that the "frame rate drop" has occurred, and stores the failure identifier FM1 to the address AD101 in the register 114*a*. If the frame rate is equal to or higher than the threshold THfr, the failure detector 114 regards that the "frame rate drop" has not occurred, and changes the address AD101 in the register 114*a* to the NULL state.

The failure detector 114 compares the transmission rate of the signal with thresholds THtr1 and THtr2 according to the obtained transmission rate of the signal The two thresholds THtr1 and THtr2 are assumed to be in the relation that $0 < THtr1 < THtr2$. If the transmission rate of the signal is equal to or higher than the threshold THtr1 and lower than the threshold THtr2, the failure detector 114 regards that the "video transmission delay abnormality" has occurred and the "image sticking" has not occurred, stores the failure identifier FM2 to the address AD102 in the register 114*a*, and changes the address AD114 in the register 114*a* to the NULL state. If the transmission rate of the signal is lower than the threshold THtr1, the failure detector 114 regards that the "video transmission delay abnormality" and the "image sticking" have occurred, and stores the failure identifier FM2 to the address AD102 and the failure identifier FM14 to the address AD114 in the register 114*a*. If the transmission rate of the signal is equal to or higher than the threshold THtr2, the failure detector 114 regards that neither the "video transmission delay abnormality" nor the "image sticking" has occurred, and changes both the addresses AD102 and AD114 in the register 114*a* to the NULL state.

The failure detector 114 can perform an ADC loopback test. In the ADC loopback test, for example, the output of each of the AD converters in the columns undergoes digital-to-analog (DA) conversion and is looped back to the input, and thereby, the test is conducted as to whether the AD conversion is properly performed. The failure detector 114 can obtain the sensitivity of the AD converter according to the ratio of the output level to the input level of the AD converter. The failure detector 114 can obtain the dynamic range of the AD conversion according to the range of the input level within which the output varies with the input. The failure detector 114 can obtain the linearity of the AD conversion according to the rate of change of the output when the input linearly changes.

The failure detector 114 compares the sensitivity of the AD conversion with a threshold THsn according to the obtained sensitivity of the AD conversion. If the sensitivity of the AD conversion is lower than the threshold THsn, the failure detector 114 regards that the "sensitivity abnormality" has occurred, and stores the failure identifier FM6 to the address AD106 in the register 114a. If the frame rate is equal to or higher than the threshold THsn, the failure detector 114 regards that the "sensitivity abnormality" has not occurred, and changes the address AD106 in the register 114a to the NULL state.

The failure detector 114 compares the dynamic range of the AD conversion with a threshold THdr according to the obtained dynamic range of the AD conversion. If the dynamic range of the AD conversion is lower than the threshold THdr, the failure detector 114 regards that the "dynamic range abnormality" has occurred, and stores the failure identifier FM7 to the address AD107 in the register 114a. If the dynamic range of the AD conversion is equal to or higher than the threshold THdr, the failure detector 114 regards that the "dynamic range abnormality" has not occurred, and changes the address AD107 in the register 114a to the NULL state.

The failure detector 114 compares the linearity of the AD conversion with a threshold THln according to the obtained linearity of the AD conversion. If the linearity of the AD conversion is lower than the threshold THln, the failure detector 114 regards that the "linearity abnormality" has occurred, and stores the failure identifier FM8 to the address AD108 in the register 114a. If the linearity of the AD conversion is equal to or higher than the threshold THln, the failure detector 114 regards that the "linearity abnormality" has not occurred, and changes the address AD108 in the register 114a to the NULL state.

The failure detector 114 includes a built-in self-test (BIST) circuit and an address pattern monitor. The BIST circuit supplies a test pattern to the vertical scan circuit, compares the output of the vertical scan circuit with an expected value, and obtains the deviation of the output of the vertical scan circuit from the expected value. The address pattern monitor acquires an address pattern for vertically scanning the pixels from the vertical scan circuit, compares the acquired address pattern with a proper address pattern, and obtains the deviation of the address pattern in the vertical direction.

The failure detector 114 estimates the deviation of the display position of the image according to the obtained deviation of the output of the vertical scan circuit from the expected value and the obtained deviation of the address pattern in the vertical direction, and compares the estimated deviation with a threshold THad. If the estimated deviation exceeds the threshold THad, the failure detector 114 regards that the "display position deviation" has occurred, and stores the failure identifier FM13 to the address AD113 in the register 114a. If the estimated deviation is equal to or lower than the threshold THad, the failure detector 114 regards that the "display position deviation" has not occurred, and changes the address AD113 in the register 114a to the NULL state.

The failure detector 114 includes a checker pattern monitor. The checker pattern monitor supplies the pixel signals having pixel values corresponding to a checker pattern to signal lines in a plurality of columns, and monitors the pixel values of the signals output from the pixel part 111 through horizontal scanning by the horizontal scan circuit.

According to the monitored pixel values, the failure detector 114 compares the pixel values corresponding to the checker pattern with the monitored pixel values. If the pixel values corresponding to the checker pattern are inverted from the monitored pixel values, the failure detector 114 regards that the "left-right inversion abnormality" has occurred, and stores the failure identifier FM15 to the address AD115 in the register 114a. If the estimated deviation is equal to or lower than the threshold THad, the failure detector 114 regards that the "display position deviation" has not occurred, and changes the address AD115 in the register 114a to the NULL state.

The failure detector 114 notifies the electronic mirror 2 of the information stored in the register 114a as to whether the failure is occurring, via the terminal 11c, the signal processor 12, the interface unit 13, and the communication medium 8, upon request from the electronic mirror 2 or autonomously. For example, if a failure notification request including the address AD101 is received from the electronic mirror 2 via the communication medium 8, the interface unit 13, the signal processor 12, and the terminal 11c, the failure detector 114 refers to the address AD101 in the register 114a. If the failure identifier FM1 is stored there, the failure detector 114 returns a failure signal having a value indicating the failure identifier FM1 to the electronic mirror 2 via the terminal 11c, the signal processor 12, the interface unit 13, and the communication medium 8. If the address AD101 in the register 114a is in the NULL state, the failure detector 114 returns a failure signal having a value indicating NULL to the electronic mirror 2 via the terminal 11c, the signal processor 12, the interface unit 13, and the communication medium 8. As a result, by referring to the response to the failure notification request, the electronic mirror 2 can know whether the failure mode "frame rate drop" corresponding to the failure identifier FM1 has occurred.

The signal processor 12 receives the pixel signals according to the image from the image sensor 11, and performs predetermined signal processing on the pixel signals. At the same time, the signal processor 12 detects a failure of the signal processor 12, and holds information on the detected failure. The signal processor 12 notifies the electronic mirror 2 of the failure via the interface unit 13 upon request from the electronic mirror 2 or autonomously.

The signal processor 12 includes a signal processing unit 121, an interface (I/F) 122, and a failure detector 123. The signal processing unit 121 includes an AD converter and an address processing circuit, and performs the predetermined signal processing on the pixel signals using the AD converter and the address processing circuit. The predetermined signal processing includes processing to adjust the dynamic range of the signals and noise reduction (NR) correction processing to reduce noise included in the signals. If the pixel part 111 supports color by, for example, including a color filter in each of the pixels, the predetermined signal processing may further include YC signal processing to generate YC signals including luminance components (Y) and chromaticity components (C) from the pixel signals.

The interface 122 exchanges communication control information with the interface unit 13 via the terminals 12e and 13b to establish communication with the interface unit 13. The interface 122 may establish the communication with the interface unit 13 according to the Inter-Integrated Circuit (I2C) protocol. The interface 122 transmits the pixel signals output from the signal processing unit 121 as one frame image to the interface unit 13 via the terminals 12d and 13a. The interface 122 can transmit the temporally continuous frame images as the video signal to the interface unit 13 via the terminals 12d and 13a.

The failure detector 123 detects the failure of the signal processor 12. The failure detector 123 may periodically detect the failure of the signal processor 12, may detect the failure of the signal processor 12 upon request from the electronic mirror 2, or may detect the failure of the signal processor 12 upon request from the electronic control unit (ECU) (not illustrated) that integrally controls the vehicle 5. The failure detector 123 includes a register 123a, and holds the information on the detected failure in the register 123a. The failure detector 123 further detects the type of the failure of the signal processor 12, identifies the failure mode according to the type of the failure, and stores the information indicating the failure mode in the register 123a, as illustrated in FIG. 4.

Suppose that a plurality of addresses AD201 to AD215 corresponding to the failure identifiers FM1 to FM15 are reserved in the register 123a. The failure identifiers FM1, FM2, FM6, FM7, FM8, FM13, FM14, and FM15 correspond to the failure modes "frame rate drop", "video transmission delay abnormality", "sensitivity abnormality", "dynamic range abnormality", "linearity abnormality", "display position deviation", "image sticking", and "left-right inversion abnormality", respectively. The failure identifiers FM1, FM2, FM6, FM7, FM8, FM13, FM14, and FM15 correspond to the addresses AD201, AD202, AD206, AD207, AD208, AD213, AD214, and AD215, respectively, in the register 123a.

The failure detector 123 includes the VD counter, the frame counter, and the internal clock monitor. The VD counter extracts the vertical drive signals (VD) from the signals processed by the signal processing unit 121, and counts the time interval between the vertical drive signal (VD) and the next vertical drive signal (VD). The failure detector 123 can obtain the temporal length of one frame period from the count value of the VD counter. The frame counter extracts the frame synchronization signals from the signals processed by the signal processing unit 121, and counts the number of the frame synchronization signals. The failure detector 123 can obtain the frame rate, for example, by dividing the counted time by the count value of the frame counter. The internal clock monitor counts the number of clocks of an internal clock used for the signal transmission performed by the interface 122. The failure detector 123 can obtain the period of the internal clock, for example, by dividing the counted time by the count value of the internal clock monitor, and obtain the transmission rate of the signal transmitted by the interface 122 according to the number of bits of the transmitted signal and the period of the internal clock.

The failure detector 123 compares the frame rate with the threshold THfr according to the temporal length of one frame period or the frame rate that has been obtained. If the frame rate is lower than the threshold THfr, the failure detector 123 regards that the "frame rate drop" has occurred, and stores the failure identifier FM1 to the address AD201 in the register 123a. If the frame rate is equal to or higher than the threshold THfr, the failure detector 123 regards that the "frame rate drop" has not occurred, and changes the address AD201 in the register 123a to the NULL state.

The failure detector 123 compares the transmission rate of the signal with the thresholds THtr1 and THtr2 according to the obtained transmission rate of the signal. The two thresholds THtr1 and THtr2 are assumed to be in the relation that 0<THtr1<THtr2. If the transmission rate of the signal is equal to or higher than the threshold THtr1 and lower than the threshold THtr2, the failure detector 123 regards that the "video transmission delay abnormality" has occurred and the "image sticking" has not occurred, stores the failure identifier FM2 to the address AD202 in the register 123a, and changes the address AD214 in the register 123a to the NULL state. If the transmission rate of the signal is lower than the threshold THtr1, the failure detector 123 regards that the "video transmission delay abnormality" has not occurred and the "image sticking" has occurred, changes the address AD202 in the register 123a to the NULL state, and stores the failure identifier FM14 to the address AD214. If the transmission rate of the signal is equal to or higher than the threshold THtr2, the failure detector 123 regards that neither the "video transmission delay abnormality" nor the "image sticking" has occurred, and changes both the addresses AD202 and AD214 in the register 123a to the NULL state.

The failure detector 123 can perform the ADC loopback test. In the ADC loopback test, for example, the output of the AD converter undergoes the DA conversion and is looped back to the input, and thereby, the test is conducted as to whether the AD conversion is properly performed. The failure detector 123 can obtain the sensitivity of the AD converter according to the ratio of the output level to the input level of the AD converter. The failure detector 123 can obtain the dynamic range of the AD conversion according to the range of the input level within which the output varies with the input. The failure detector 123 can obtain the linearity of the AD conversion according to the rate of change of the output when the input linearly changes.

The failure detector 123 compares the sensitivity of the AD conversion with the threshold THsn according to the obtained sensitivity of the AD conversion. If the sensitivity of the AD conversion is lower than the threshold THsn, the failure detector 123 regards that the "sensitivity abnormality" has occurred, and stores the failure identifier FM6 to the address AD206 in the register 123a. If the frame rate is equal to or higher than the threshold THsn, the failure detector 123 regards that the "sensitivity abnormality" has not occurred, and changes the address AD206 in the register 123a to the NULL state.

The failure detector 123 compares the dynamic range of the AD conversion with the threshold THdr according to the obtained dynamic range of the AD conversion. If the dynamic range of the AD conversion is lower than the threshold THdr, the failure detector 123 regards that the "dynamic range abnormality" has occurred, and stores the failure identifier FM7 to the address AD207 in the register 123a. If the dynamic range of the AD conversion is equal to or higher than the threshold THdr, the failure detector 123 regards that the "dynamic range abnormality" has not occurred, and changes the address AD207 in the register 123a to the NULL state.

The failure detector 123 compares the linearity of the AD conversion with the threshold THln according to the obtained linearity of the AD conversion. If the linearity of the AD conversion is lower than the threshold THln, the failure detector 123 regards that the "linearity abnormality" has occurred, and stores the failure identifier FM8 to the address AD208 in the register 123a. If the linearity of the AD conversion is equal to or higher than the threshold THln, the failure detector 123 regards that the "linearity abnormality" has not occurred, and changes the address AD208 in the register 123a to the NULL state.

The failure detector 123 includes the built-in self-test (BIST) circuit and the address pattern monitor. The BIST circuit supplies a test pattern to the address processing circuit, compares the output of the address processing circuit with an expected value, and obtains the deviation of the output of the address processing circuit from the expected value. The address pattern monitor acquires an address pattern from the address processing circuit, compares the acquired address pattern with a proper address pattern, and obtains the deviation of the address pattern in the vertical direction.

The failure detector 123 estimates the deviation of the display position of the image according to the obtained deviation of the output of the address processing circuit from the expected value and the obtained deviation of the address pattern in the vertical direction, and compares the estimated deviation with the threshold THad. If the estimated deviation exceeds the threshold THad, the failure detector 123 regards that the "display position deviation" has occurred, and stores the failure identifier FM13 to the address AD213 in the register 123a. If the estimated deviation is equal to or lower than the threshold THad, the failure detector 123 regards that the "display position deviation" has not occurred, and changes the address AD213 in the register 123a to the NULL state.

The failure detector 123 includes the checker pattern monitor. The checker pattern monitor supplies the pixel signals having pixel values corresponding to a checker pattern to the signal processing unit 121, and monitors the pixel values of the signals output from the signal processing unit 121 through address processing by the address processing circuit.

According to the monitored pixel values, the failure detector 123 compares the pixel values corresponding to the checker pattern with the monitored pixel values. If the pixel values corresponding to the checker pattern are inverted from the monitored pixel values, the failure detector 123 regards that the "left-right inversion abnormality" has occurred, and stores the failure identifier FM15 to the address AD215 in the register 123a. If the estimated deviation is equal to or lower than the threshold THad, the failure detector 123 regards that the "display position deviation" has not occurred, and changes the address AD215 in the register 123a to the NULL state.

The failure detector 123 notifies the electronic mirror 2 of the information stored in the register 123a as to whether the failure is occurring, via the terminal 12f, the interface unit 13, and the communication medium 8, upon request from the electronic mirror 2 or autonomously. For example, if a failure notification request including the address AD201 is received from the electronic mirror 2 via the communication medium 8, the interface unit 13, and the terminal 12f, the failure detector 123 refers to the address AD201 in the register 123a. If the failure identifier FM1 is stored there, the failure detector 123 returns a failure signal having a value indicating the failure identifier FM1 to the electronic mirror 2 via the terminal 12f, the interface unit 13, and the communication medium 8. If the address AD201 in the register 123a is in the NULL state, the failure detector 123 returns a failure signal having a value indicating NULL to the electronic mirror 2 via the terminal 12f, the interface unit 13, and the communication medium 8. As a result, by referring to the value of the failure signal, the electronic mirror 2 can know whether the failure mode "frame rate drop" corresponding to the failure identifier FM1 has occurred.

The interface unit 13 notifies the electronic mirror 2 of the failure detected by the image sensor 11 and/or the signal processor 12. The interface unit 13 is connected to the electronic mirror 2 via the communication medium 8. In the initial state, the interface unit 13 establishes a communication connection with the electronic mirror 2 via the communication medium 8 under control from a controller 23.

Once the communication connection is established, the interface unit 13 performs interface operations in the communication of the image sensor 11 and the signal processor 12 with the electronic mirror 2. The interface unit 13 converts the format of signals in the communication. If the communication medium 8 supports serial communication, the interface unit 13 may include a serializer 131. The serializer 131 converts the video signal received from the image sensor 11 and/or the signal processor 12 via the terminal 13a from a parallel format into a serial format, and transmits the video signal in the serial format to the electronic mirror 2 via the terminal 13d and the communication medium 8. The serializer 131 converts the communication control information received from the image sensor 11 and/or the signal processor 12 via the terminal 13b from the parallel format into the serial format, and transmits the communication control information in the serial format to the electronic mirror 2 via the terminal 13d and the communication medium 8. The serializer 131 converts the failure signal received from the image sensor 11 and/or the signal processor 12 via the terminal 13c from the parallel format into the serial format, and transmits the failure signal in the serial format to the electronic mirror 2 via the terminal 13d and the communication medium 8.

As illustrated in FIG. 5, the electronic mirror 2 includes the interface (I/F) unit 21, the controller 23, a video processor 24, the display 27, a mirror 28, display annunciators 29-1 to 29-15, and an audio annunciator 31. FIG. 5 is a diagram illustrating a configuration of the electronic mirror 2.

The interface unit 21 is connected to the imaging device 1 via the communication medium 8. The interface unit 13 includes a connector 211, to which the imaging device 1 is connected via the communication medium 8. The interface unit 21 performs interface operations in the communication between the imaging device 1 and the controller 23. The interface unit 21 converts the format of signals in the communication. If the communication medium 8 supports serial communication, the interface unit 13 may include a deserializer 212. The deserializer 212 converts the video signal transmitted from the imaging device 1 via the communication medium 8 and the connector 211 from the serial format into the parallel format, and transmits the video signal in the parallel format to the video processor 24. The deserializer 212 converts the failure signal received from the imaging device 1 via the communication medium 8 and the connector 211 from the serial format into the parallel format, and supplies the failure signal in the parallel format to the controller 23. The video signal and the failure signal may be transmitted from the connector 211 to the deserializer 212 by communication according to the Flat Panel Display Link (FPD-Link) protocol. The video signal may be transmitted from the deserializer 212 to the video processor 24 by communication according to the Mobile Industry Processor Interface (MIPI) protocol.

The video processor 24 converts the video signal transmitted from the deserializer 212 into a video signal for display and supplies it to the display 27. As a result, the display 27 displays the video according to the video signal on the screen.

If the controller 23 receives a failure signal, the controller 23 identifies whether the failure indicated by the failure signal is occurring and the type of the failure. The controller 23 announces the information on the failure using at least one of audio and display according to whether the failure is occurring and the type of the failure.

The controller 23 may use at least one of the display annunciators 29-1 to 29-15 to make the announcement according to whether the failure is occurring and the type of the failure. Each of the display annunciators 29-1 to 29-15 is an indicator light, such as a light-emitting diode (LED). The display annunciators 29-1, 29-2, 29-6, 29-7, 29-8, 29-13, 29-14, and 29-15 correspond to the failure identifiers FM1, FM2, FM6, FM7, FM8, FM13, FM14, and FM15, respectively. That is, the display annunciators 29-1, 29-2, 29-6, 29-7, 29-8, 29-13, 29-14, and 29-15 correspond to the failure modes "frame rate drop", "video transmission delay abnormality", "sensitivity abnormality", "dynamic range abnormality", "linearity abnormality", "display position deviation", "image sticking", and "left-right inversion abnormality", respectively (refer to FIG. 4). For example, if the controller 23 receives a failure signal indicating the failure identifier FM1, the controller 23 selectively turns on the display annunciator 29-1 (refer to FIG. 2). Thus, the occurrence of the "frame rate drop" can be announced to the user.

The controller 23 may use the audio annunciator 31 to make the announcement according to whether the failure is occurring and the type of the failure. The audio annunciator 31 is, for example, an alarm. For example, if the controller 23 receives the failure signal indicating the failure identifier FM1, the controller 23 causes the audio annunciator 31 (refer to FIG. 2) to output an alarm sound or a warning message sound. Thus, the occurrence of the "frame rate drop" can be announced to the user.

The controller 23 may use the display 27 to make the announcement according to whether the failure is occurring and the type of the failure. For example, if the controller 23 receives the failure signal indicating the failure identifier FM1, the controller 23 causes the display 27 (refer to FIG. 2) to display a warning message on the screen thereof. Thus, the occurrence of the "frame rate drop" can be announced to the user.

As described above, in the first embodiment, in the electronic mirror system 3, the imaging device 1 detects the failure of the imaging device 1 and notifies the electronic mirror 2 of the failure, and the electronic mirror 2 announces the failure signal regarding the notified failure to the user. This operation can prompt the user to respond to the occurrence of the failure of the imaging device 1, and thus, allows the electronic mirror system 3 to return to the properly operating state. Therefore, the convenience of the electronic mirror system 3 can be improved.

While FIG. 3 illustrates the configuration in which the failure detectors 114 and 123 are implemented as hardware in the image sensor 11 and the signal processor 12, respectively, the failure detectors 114 and 123 may be implemented as software in the image sensor 11 and the signal processor 12. For example, a controller, a read-only memory (ROM), and a random-access memory (RAM) may be mounted in each of the image sensor 11 and the signal processor 12. In this case, a failure detection computer program may be stored in the ROM in each of the image sensor 11 and the signal processor 12, and the controller may read the failure detection computer program from the ROM and load a corresponding one of the failure detectors 114 and 123 as a functional configuration in the RAM in response to, for example, the startup of the imaging device 1.

Second Embodiment

The following describes the electronic mirror system according to a second embodiment. The following description focuses on differences from the first embodiment.

In the second embodiment, in order to further improve the convenience, the electronic mirror system 3 is configured to be capable of switching the operation of the electronic mirror 2 in response to the detection of a failure in the imaging device 1.

Specifically, in the electronic mirror system 3, the electronic mirror 2 switches between a display mode and a mirror mode according to the failure notified from the imaging device 1. The display mode is a mode in which the electronic mirror 2 serves as the display that displays the image captured by the imaging device 1. The mirror mode is a mode in which the electronic mirror 2 serves as the mirror.

Figure 6:
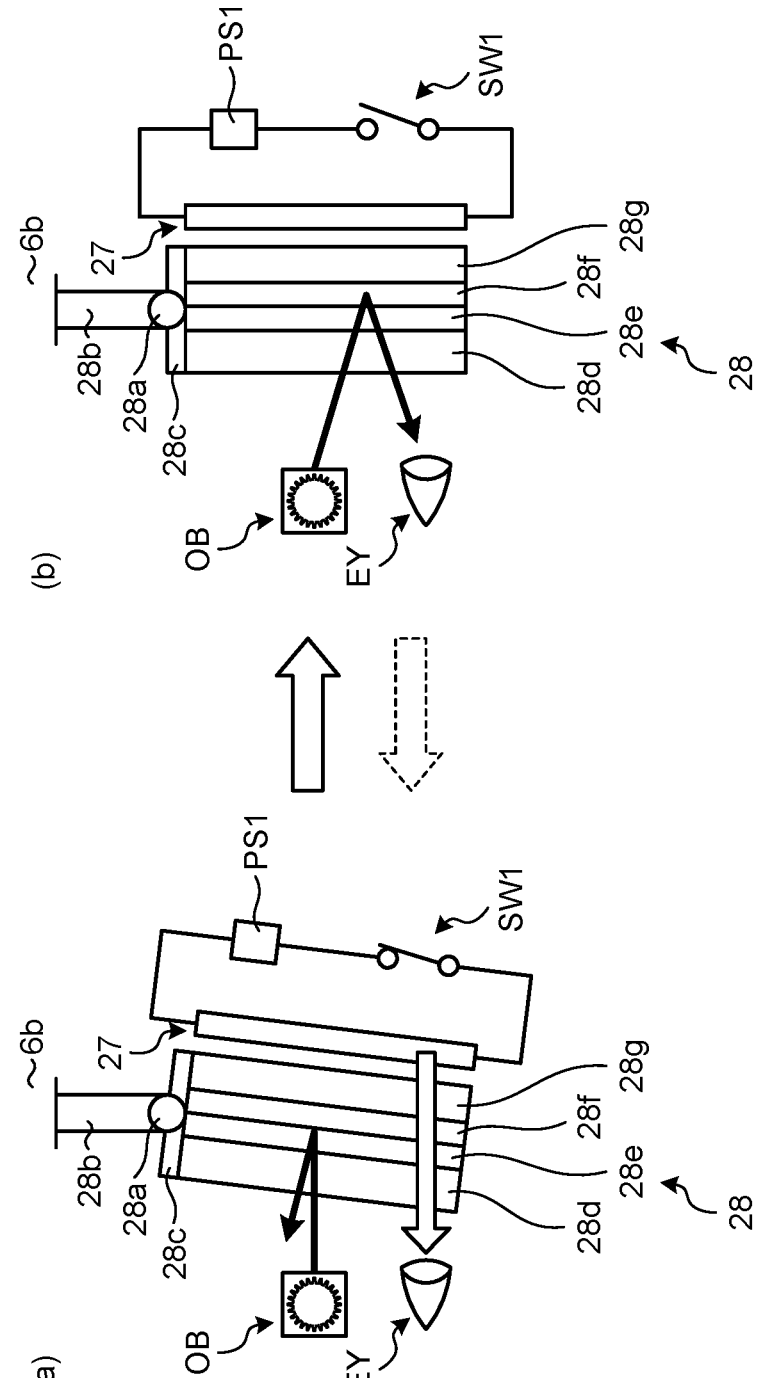
FIG. 6 is a diagram illustrating switching between a display mode and a mirror mode in a second embodiment.

As a configuration for switching between the display mode and the mirror mode, the electronic mirror 2 may further include a drive interface (drive I/F) 25 and a driver 26, as illustrated in FIG. 5. The rotating portion 28*a* (refer to FIG. 2) includes a motor, and is drivable by the driver 26. If the drive interface 25 receives an instruction from the controller 23 to switch the mode from the display mode to the mirror mode, the drive interface 25 generates a rotation command and supplies it to the driver 26 in response to the instruction. According to the rotation command, the driver 26 rotates the motor of the rotating portion 28*a* to change the attitude of the housing 28*c* from that illustrated in FIG. 6(*a*) to that illustrated in FIG. 6(*b*). FIG. 6 is a diagram illustrating the switching between the display mode and the mirror mode, FIG. 6(*a*) illustrating the display mode, and FIG. 6(*b*) illustrating the mirror mode.

In the display mode, a line normal to a reflection surface of a reflection layer 28*f* supported by the housing 28*c* is adjusted so as to be directed upward with respect to a horizontal plane. Therefore, as indicated by an arrow in FIG. 6(*a*), light from a subject OB behind the vehicle body 6 is difficult to reach a viewpoint position EY of the user. The controller 23 turns on a switch SW1 that connects the display 27 to a power supply PS1, and the display 27 is operating and displaying the image on the screen. Therefore, as indicated by a white arrow in FIG. 6(*a*), the image displayed on the display 27 can easily reach the viewpoint position EY of the user. As a result, the electronic mirror 2 serves as the display that displays the image captured by the imaging device 1. The reflection layer 28*f* supported by the housing 28*c* is covered with an electrochromic (EC) material 28*e* on the front and glass 28*g* on the back. The EC material 28*e* is covered with glass 28*d* on the front.

In the mirror mode, as indicated by an arrow in FIG. 6(*b*), the line normal to the reflection surface of the reflection layer 28*f* supported by the housing 28*c* is adjusted so as to be directed substantially along the horizontal plane. Therefore, the light from the subject OB behind the vehicle body 6 can easily reach the viewpoint position EY of the user. The controller 23 turns off the switch SW1, and the display 27 stops and displays no image on the screen. As a result, the electronic mirror 2 serves as the mirror.

The switching from the display mode to the mirror mode can be performed as illustrated in FIG. 7. FIG. 7 is a flowchart illustrating an operation of the electronic mirror system 3.

In the electronic mirror system 3, if the imaging device 1 detects a failure (S1), the imaging device 1 notifies the electronic mirror 2 of the failure. The imaging device 1 may detect the type of the failure in addition to whether the failure is occurring, generate a failure signal indicating the type of the failure, and notify the electronic mirror 2 of the failure signal. The imaging device 1 may notify the electronic mirror 2 of a plurality of failure signals.

In the electronic mirror 2, after the controller 23 is notified of the failure, the controller 23 identifies whether the failure is occurring and the type of the failure (S2). After the controller 23 receives the failure signal, the controller 23 identifies whether the failure indicated by the failure signal is occurring and the type of the failure. According to whether the failure is occurring and the type of the failure, the controller 23 determines whether to switch the mode from the display mode to the mirror mode (S3). The controller 23 may determine whether to switch the mode from the display mode to the mirror mode according to whether a failure indicated by each of a plurality of failure signals is occurring and the type of the failure.

For example, if the failure signal indicates the failure identifier FM1 (refer to FIG. 4), the controller 23 determines that the failure mode "frame rate drop" is occurring, but this failure is a failure that allows the display mode to be continued.

If the failure signal indicates the failure identifier FM2, the controller 23 determines that the failure mode "abnormal video transmission" is occurring, and this failure is a failure indicating that the display mode should not be continued.

If the failure signal indicates the failure identifier FM6, the controller 23 determines that the failure mode "sensitivity abnormality" is occurring, and this failure is a failure indicating that the display mode should not be continued.

If the failure signal indicates the failure identifier FM7, the controller 23 determines that the failure mode "dynamic range abnormality" is occurring, and this failure is a failure indicating that the display mode should not be continued.

If the failure signal indicates the failure identifier FM8, the controller 23 determines that the failure mode "linearity abnormality" is occurring, and this failure is a failure indicating that the display mode should not be continued.

If the failure signal indicates the failure identifier FM13, the controller 23 determines that the failure mode "display position deviation" is occurring, and this failure is a failure indicating that the display mode should not be continued.

If the failure signal indicates the failure identifier FM14, the controller 23 determines that the failure mode "image sticking" is occurring, and this failure is a failure indicating that the display mode should not be continued.

If the failure signal indicates the failure identifier FM15, the controller 23 determines that the failure mode "left-right inversion abnormality" is occurring, and this failure is a failure indicating that the display mode should not be continued.

If failures indicated by a plurality of failure signals include a failure indicating that the display mode should not be continued, the controller 23 determines that the mode should be switched. If each of the failures indicated by the failure signals is a failure that allows the display mode to be continued, or is indicated as NULL (no failure), the controller 23 determines that the mode should not be switched. If all the failure signals indicate NULL, the controller 23 determines that no failure is occurring, and the mode should not be switched.

If the mode should not be switched (No at S3), the controller 23 continues the display mode as the operating mode of the electronic mirror 2 (S4), and announces the information on the failure using at least one of display and audio (S5).

If the mode should be switched (Yes at S3), the controller 23 switches the operating mode of the electronic mirror 2 from the display mode to the mirror mode (S6). That is, the controller 23 instructs the drive interface 25 to switch the mode from the display mode to the mirror mode. After the drive interface 25 receives the instruction from the controller 23 to switch the mode from the display mode to the mirror mode, the drive interface 25 generates a rotation command and supplies it to the driver 26 in response to the instruction. According to the rotation command, the driver 26 rotates the motor of the rotating portion 28a to change the attitude of the housing 28c from that illustrated in FIG. 6(a) to that illustrated in FIG. 6(b). The controller 23 then announces the information on the failure using at least one of display and audio (S7).

As described above, in the second embodiment, the electronic mirror system 3 can switch the operation of the electronic mirror 2 from the display mode to the mirror mode in response to the detection of the failure in the imaging device 1. This feature can further improve the convenience of the electronic mirror system 3.

Third Embodiment

The following describes the electronic mirror system according to a third embodiment. The following description focuses on differences from the first and the second embodiments.

The switching between the display mode and the mirror mode is performed by the mechanical switching operation in the second embodiment, but is performed by an electrical switching operation in the third embodiment.

Specifically, as illustrated in FIG. 8(a), the mirror 28 in the electronic mirror 2 includes a variable transmittance layer 28f' instead of the reflection layer 28f. The variable transmittance layer 28f' has a structure layered with a polarization layer and a liquid crystal material layer. In the variable transmittance layer 28f', if no voltage is applied to both ends of the liquid crystal material layer, the polarization direction of the liquid crystal material almost coincides with that of the polarization layer, resulting in a state of high transmittance and low reflectance of light. In the variable transmittance layer 28f', if a voltage is applied to both ends of the liquid crystal material layer, the polarization direction of the liquid crystal material changes to differ from that of the polarization layer, resulting in a state of low light transmittance and high reflectance.

Figure 8:
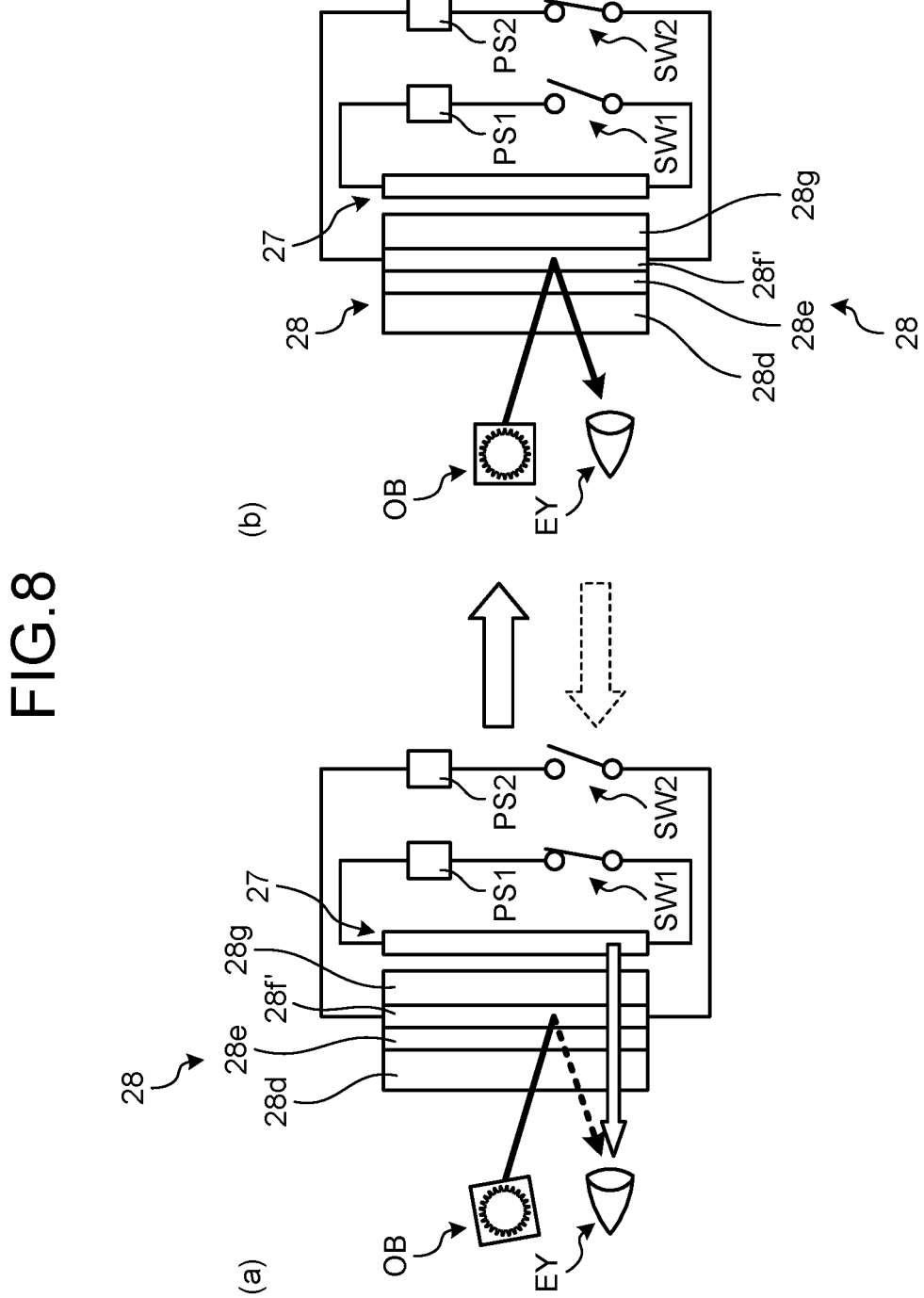
FIG. 8 is a diagram illustrating the switching between the display mode and the mirror mode in a third embodiment.

As a configuration for switching between the display mode and the mirror mode, the electronic mirror 2 may further include the drive interface (drive I/F) 25 and the driver 26, as illustrated in FIG. 5. If the drive interface 25 receives an instruction from the controller 23 to switch the mode from the display mode to the mirror mode, the drive interface 25 generates an operation command and supplies it to the driver 26 in response to the instruction. According to the operation command, the driver 26 drives the variable transmittance layer 28f' to change the state of the mirror 28 from the state of high transmittance illustrated in FIG. 8(a) to the state of low transmittance illustrated in FIG. 8(b). FIG. 8 is a diagram illustrating the switching between the display mode and the mirror mode, FIG. 8(a) illustrating the display mode, and FIG. 8(b) illustrating the mirror mode.

In the display mode, the driver 26 turns off a switch SW2 that connects the variable transmittance layer 28f' to a power supply PS2, and thus, the variable transmittance layer 28f' is in the state of high transmittance and low reflectance. Therefore, the light from the subject OB behind the vehicle body 6 is difficult to reach the viewpoint position EY of the user, as indicated by a dotted-line arrow in FIG. 8(a). The controller 23 turns on a switch SW1 that connects the display 27 to a power supply PS1, and the display 27 is operating and displaying the image on the screen. Therefore, as indicated by a white arrow in FIG. 8(*a*), the image displayed on the display 27 can easily reach the viewpoint position EY of the user. As a result, the electronic mirror 2 serves as the display that displays the image captured by the imaging device 1.

In the mirror mode, the driver 26 turns on the switch SW2 that connects the variable transmittance layer 28*f* to the power supply PS2, and thus, the variable transmittance layer 28*f* is in the state of low transmittance and high reflectance. Therefore, the light from the subject OB behind the vehicle body 6 can easily reach the viewpoint position EY of the user, as indicated by a solid-line arrow in FIG. 8(*b*). The controller 23 turns off the switch SW1, and the display 27 stops and displays no image on the screen. As a result, the electronic mirror 2 serves as the mirror.

As described above, in the third embodiment, the electronic mirror system 3 can switch the mode of the electronic mirror 2 from the display mode to the mirror mode through the electrical operation in response to the detection of the failure in the imaging device 1. This feature can also further improve the convenience of the electronic mirror system 3.

Fourth Embodiment

The following describes the electronic mirror system according to a fourth embodiment. The following description focuses on differences from the first to the third embodiments.

In the second embodiment, the switching from the display mode to the mirror mode is performed according to whether the failure of the imaging device 1 is occurring and the type of the failure. In the fourth embodiment, the switching is performed according further to the level of the failure.

Figure 9:
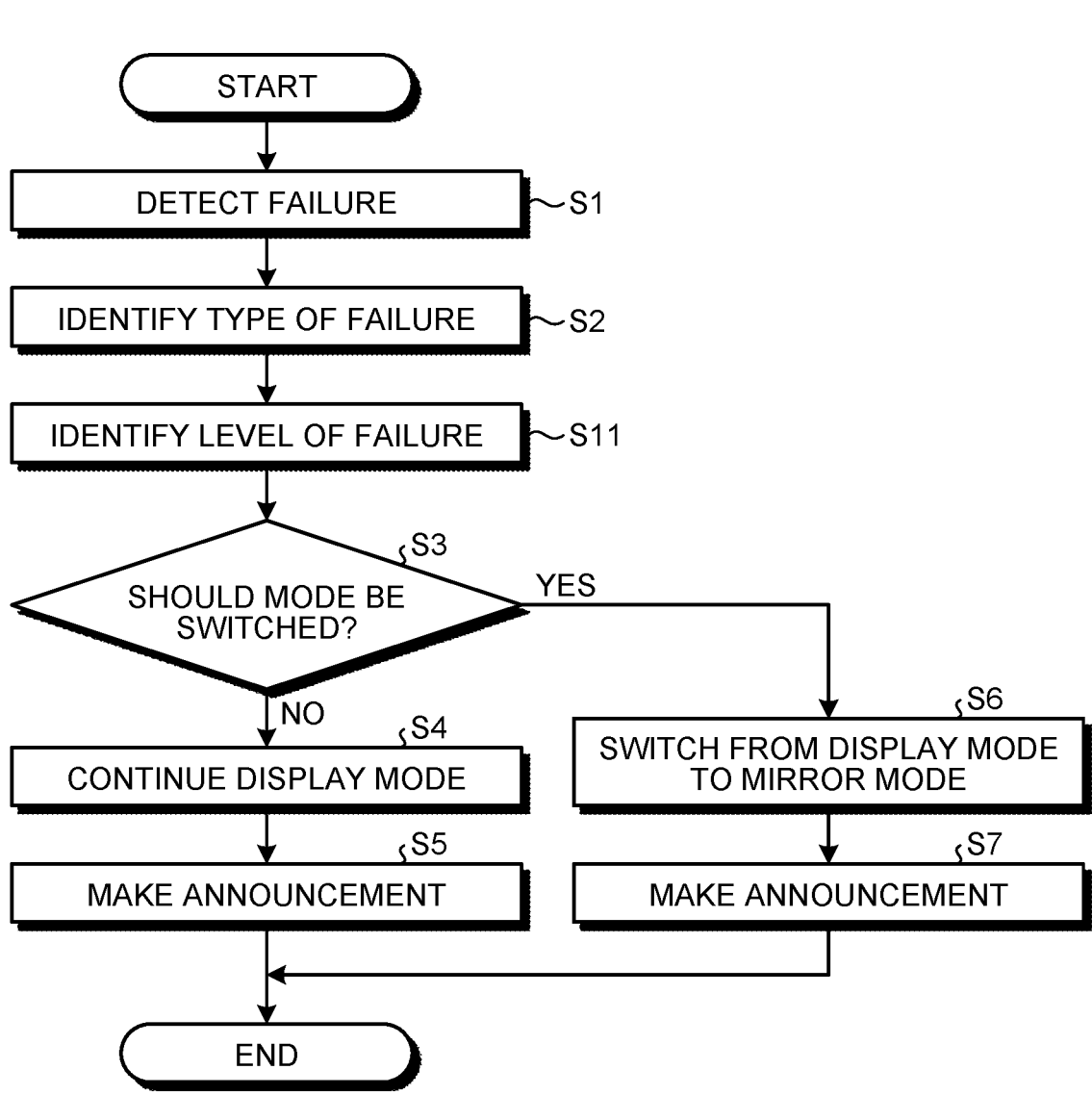
FIG. 9 is a flowchart illustrating an operation of the electronic mirror system in a fourth embodiment.

Specifically, in the switching from the display mode to the mirror mode, a process different from that of the second embodiment in the following respects can be performed, as illustrated in FIG. 9. FIG. 9 is a flowchart illustrating an operation of the electronic mirror system 3.

In the electronic mirror system 3, in the detection of the failure (S1), the imaging device 1 may detect the level of the failure in addition to whether the failure is occurring and the type of the failure, generate the failure signal indicating the type of the failure, and notify the electronic mirror 2 of the failure signal.

For example, regarding the frame rate, the failure detector 114 compares the frame rate with a plurality of thresholds THfr1 and THfr2 according to the temporal length of one frame period or frame rate that has been obtained. The thresholds THfr1 and THfr2 are assumed to be in the relation that $0<THfr1<THfr2$. If the frame rate is equal to or higher than the threshold THfr1 and lower than the threshold THfr2, the failure detector 114 regards that the "frame rate drop" has occurred at a level LV1, and stores the failure identifier FM1 and the level LV1 at the address AD101 in the register 114*a*. If the frame rate is lower than the threshold THfr1, the failure detector 114 regards that the "frame rate drop" has occurred at a level LV2, and stores the failure identifier FM1 and the level LV2 to the address AD101 in the register 114*a*. If the frame rate is equal to or higher than the threshold THfr2, the failure detector 114 regards that the "frame rate drop" has not occurred, and changes the address AD101 in the register 114*a* to the NULL state.

In the electronic mirror 2, after the controller 23 is notified of the failure, the controller 23 identifies whether the failure is occurring and the type of the failure (S2). After the controller 23 receives the failure signal, the controller 23 identifies whether the failure indicated by the failure signal is occurring and the type of the failure. In addition, if the failure signal indicates the level of the failure, the controller 23 identifies the level of the failure (S11). According to whether the failure is occurring, the type of the failure, and the level of the failure, the controller 23 determines whether to switch the mode from the display mode to the mirror mode (S3).

For example, if the failure signal indicates the failure identifier FM1 (refer to FIG. 4) and the failure level LV1, the controller 23 determines that the failure mode "frame rate drop" has occurred at the level LV1, but this failure at the level LV1 is a failure that allows the display mode to be continued.

If the failure signal indicates the failure identifier FM1 (refer to FIG. 4) and the failure level LV2, the controller 23 determines that the failure mode "frame rate drop" has occurred at the level LV2, and this failure at the level LV2 is a failure indicating that the display mode should not be continued.

If failures indicated by a plurality of failure signals include a failure indicating that the display mode should not be continued, the controller 23 determines that the mode should be switched. If each of the failures indicated by the failure signals is a failure that allows the display mode to be continued, or is indicated as NULL (no failure), the controller 23 determines that the mode should not be switched. If all the failure signals indicate NULL, the controller 23 determines that no failure is occurring, and the display mode should not be switched.

The controller 23 is the same as that of the second embodiment in performing the processes at S4 and S5 if the mode should not be switched (No at S3), and performing the processes at S6 and S7 if the mode should be switched (Yes at S3).

As described above, in the fourth embodiment, the electronic mirror system 3 can switch the operation of the electronic mirror 2 from the display mode to the mirror mode according to whether the failure of the imaging device 1 is occurring, the type of the failure, and the level of the failure. This feature can further improve the convenience of the electronic mirror system 3.

Fifth Embodiment

The following describes the electronic mirror system according to a fifth embodiment. The following description focuses on differences from the first to the fourth embodiments.

In the fifth embodiment, an operation of returning from the mirror mode to the display mode will be described as an operation after the switching from the display mode to the mirror mode.

Figure 10:
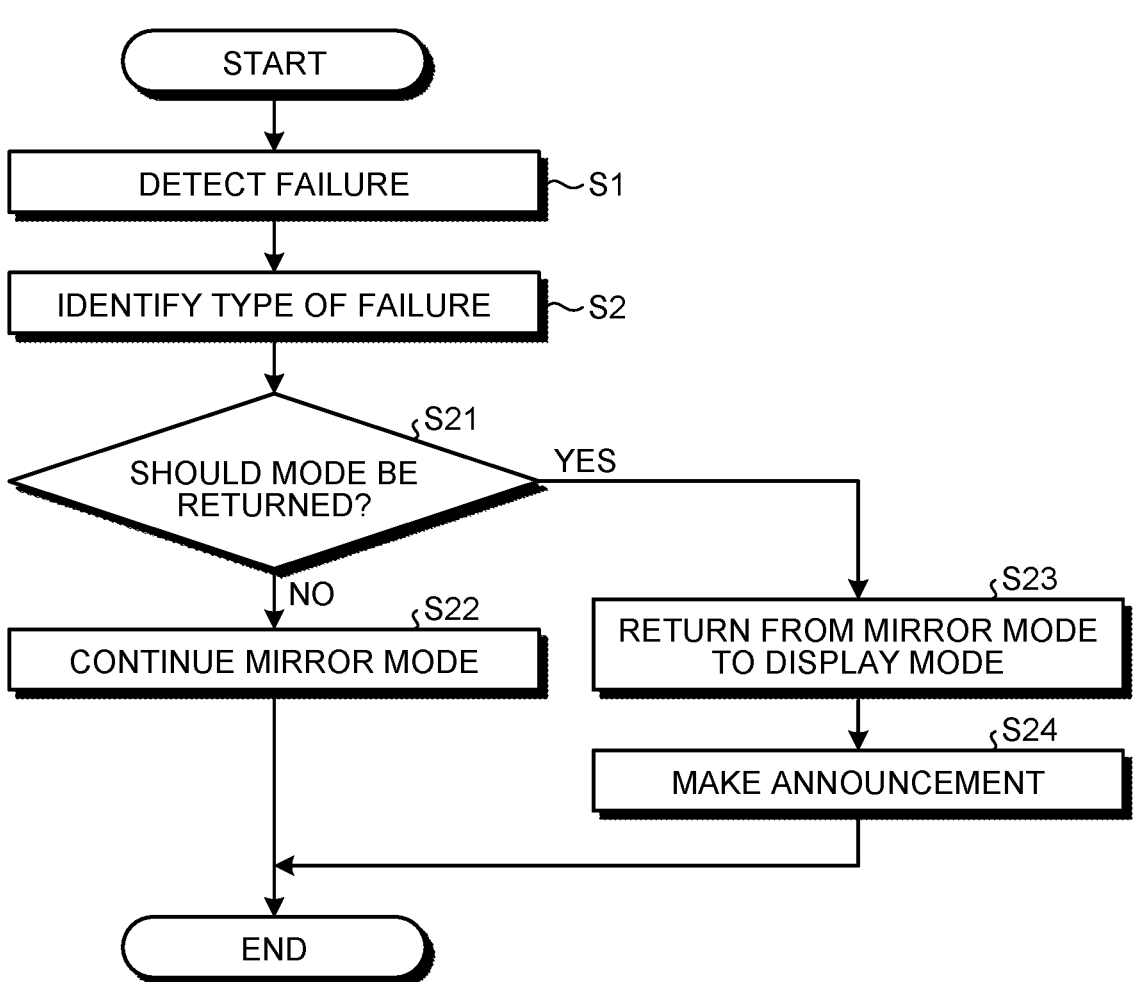
FIG. 10 is a flowchart illustrating an operation of the electronic mirror system in a fifth embodiment.

Specifically, in the return from the mirror mode to the display mode, processes different from those of the second embodiment in the following respects can be performed as illustrated in FIG. 10. FIG. 10 is a flowchart illustrating an operation of the electronic mirror system 3.

According to whether a failure is occurring and the type of the failure, the controller 23 determines whether to return the mode from the mirror mode to the display mode (S21). For example, if failures indicated by a plurality of failure signals include a failure indicating that the display mode should not be continued, the controller 23 determines not to return the mode. If each of the failures indicated by the failure signals is a failure that allows the display mode to be continued, or is indicated as NULL (no failure), the controller 23 determines that the mode should be returned. If all the failure signals indicate NULL, the controller 23 determines that no failure is occurring, and the mode should be returned.

If the mode should not be returned (No at S21), the controller 23 continues the mirror mode as the operating mode of the electronic mirror 2 (S22).

If the mode should be returned (Yes at S21), the controller 23 returns the operating mode of the electronic mirror 2 from the mirror mode to the display mode (S23). That is, the controller 23 instructs the drive interface 25 to switch the mode from the mirror mode to the display mode. After the drive interface 25 receives the instruction from the controller 23 to switch the mode from the mirror mode to the display mode, the drive interface 25 generates a rotation command and supplies it to the driver 26 in response to the instruction. According to the rotation command, the driver 26 rotates the motor of the rotating portion 28a to change the attitude of the housing 28c from that illustrated in FIG. 6(b) to that illustrated in FIG. 6(a).

The controller 23 then announces the information on the return of the mode from the mirror mode to the display mode using at least one of display and audio (S24). For example, the controller 23 may announce the return by turning off all the display annunciators 29-1 to 29-15. The controller 23 may announce the return by causing the audio annunciator 31 (refer to FIG. 2) to output the alarm sound or a message sound. The controller 23 may announce the return by displaying a message on the screen of the display 27 (refer to FIG. 2).

As described above, in the fifth embodiment, the electronic mirror system 3 can return the operation of the electronic mirror 2 from the mirror mode to the display mode according to whether a failure of the imaging device 1 is occurring and the type of the failure. For example, the operation of the electronic mirror 2 can be returned from the mirror mode to the display mode if the failure of the imaging device 1 is a temporary failure, or if the imaging device 1 has been replaced with a repaired imaging device or another imaging device. This feature can further improve the convenience of the electronic mirror system 3.

Sixth Embodiment

The following describes the electronic mirror system according to a sixth embodiment. The following description focuses on differences from the first to the fifth embodiments.

In the sixth embodiment, in order to further improve the convenience, the electronic mirror system 3 is configured to be capable of switching the connection partner of the electronic mirror 2 from the imaging device 1 to another imaging device 4 in response to the detection of a failure in the imaging device 1.

Figure 11:
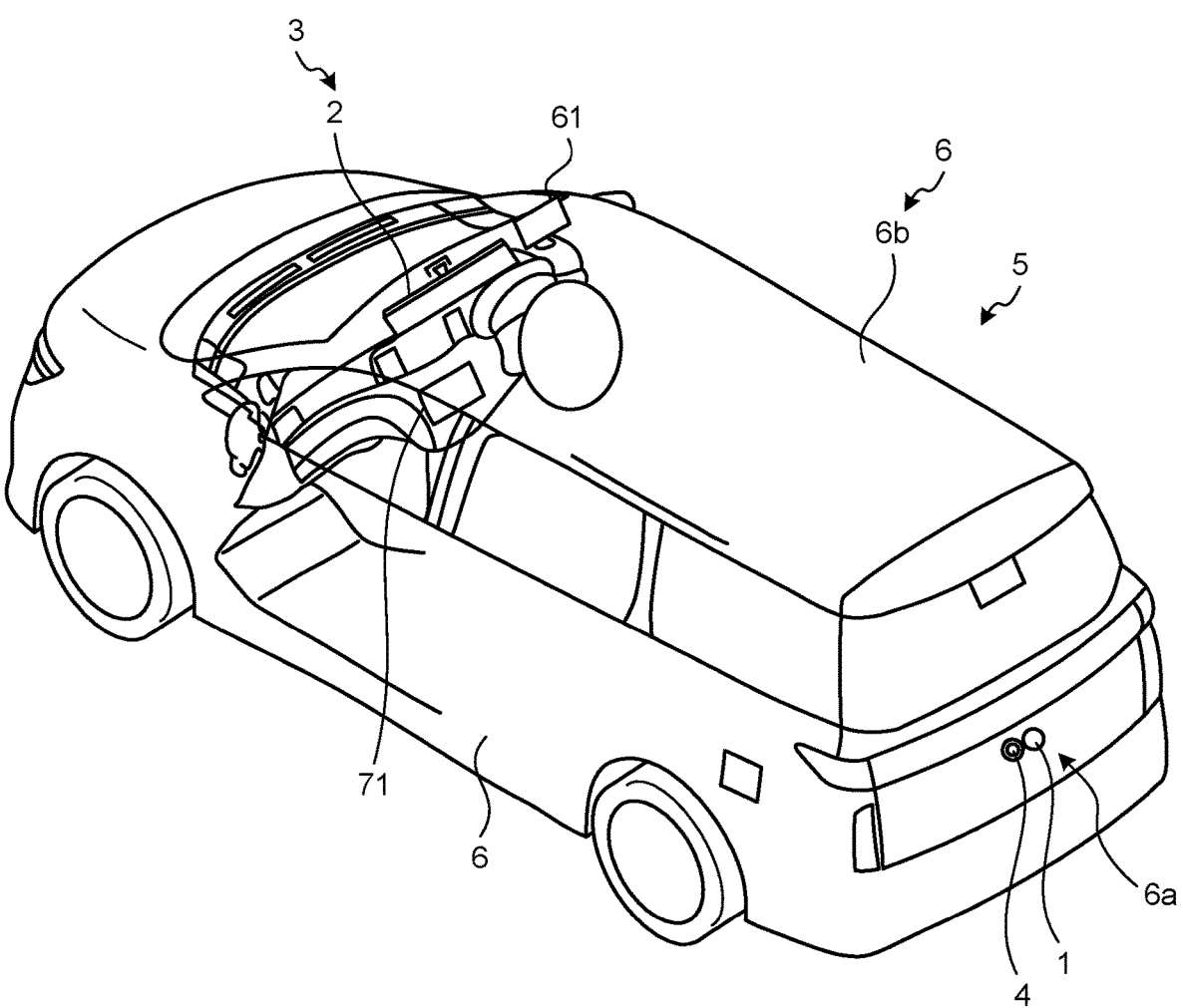
FIG. 11 is a view illustrating the vehicle on which the electronic mirror system according to a sixth embodiment is mounted.

Specifically, the electronic mirror system 3 further includes the imaging device 4. The imaging device 4 is an in-vehicle camera mounted on the vehicle 5, and is located in a position adjacent to the imaging device 1 outside or inside the vehicle body 6, as illustrated in FIG. 11. FIG. 11 is a view illustrating the vehicle on which the electronic mirror system 3 is mounted. The imaging device 4 is an alternative to the imaging device 1, and may stop operating while the imaging device 1 is operating properly. The configuration of the imaging device 4 may be the same as that of the imaging device 1 as illustrated in FIG. 3, or may be a configuration obtained by removing the failure detectors 114 and 123 from that of FIG. 3.

Figure 12:
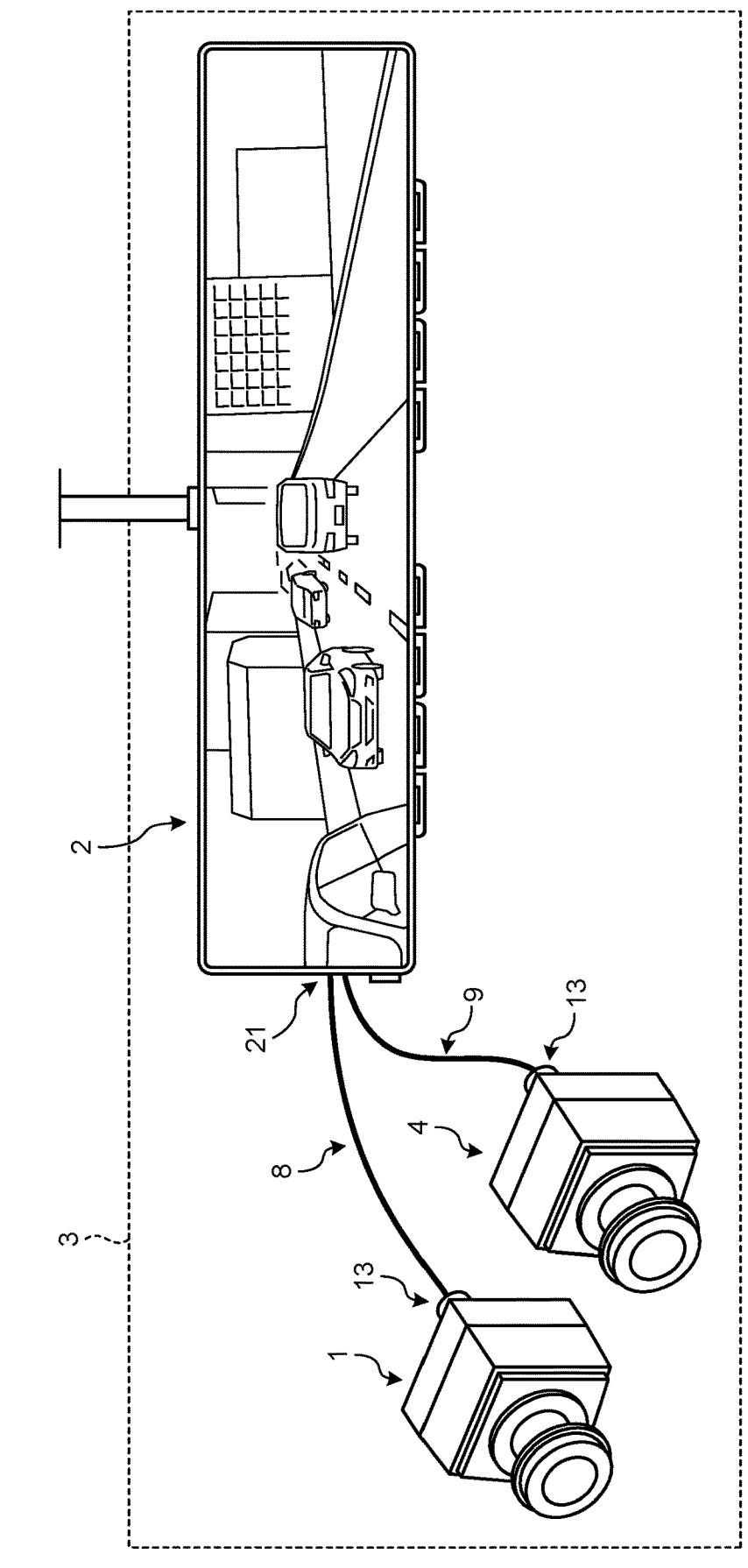
FIG. 12 is a view illustrating a configuration of the electronic mirror system according to the sixth embodiment.

In the electronic mirror system 3, the imaging device 4 and the electronic mirror 2 are communicably connected to each other via a communication medium 9, as illustrated in FIG. 12. FIG. 12 is a view illustrating a configuration of the electronic mirror system 3. The communication medium 9 may be a communication cable such as a serial cable or a wireless communication line such as Bluetooth. FIG. 12 illustrates a configuration in which the communication medium 9 is the communication cable, and one end of the communication medium 9 is connected to the interface (I/F) unit 13 of the imaging device 4 and the other end of the communication medium 9 is connected to the I/F unit 21 of the electronic mirror 2.

The electronic mirror 2 switches between a main connection state and an auxiliary connection state according to the notified failure. The main connection state is a state where the communicable connection partner of the electronic mirror 2 is the imaging device 1, and an image acquired by the imaging device 1 is displayed. The auxiliary connection state is a stated where the communicable connection partner of the electronic mirror 2 is the imaging device 4, and an image acquired by the imaging device 4 is displayed.

Figure 13:
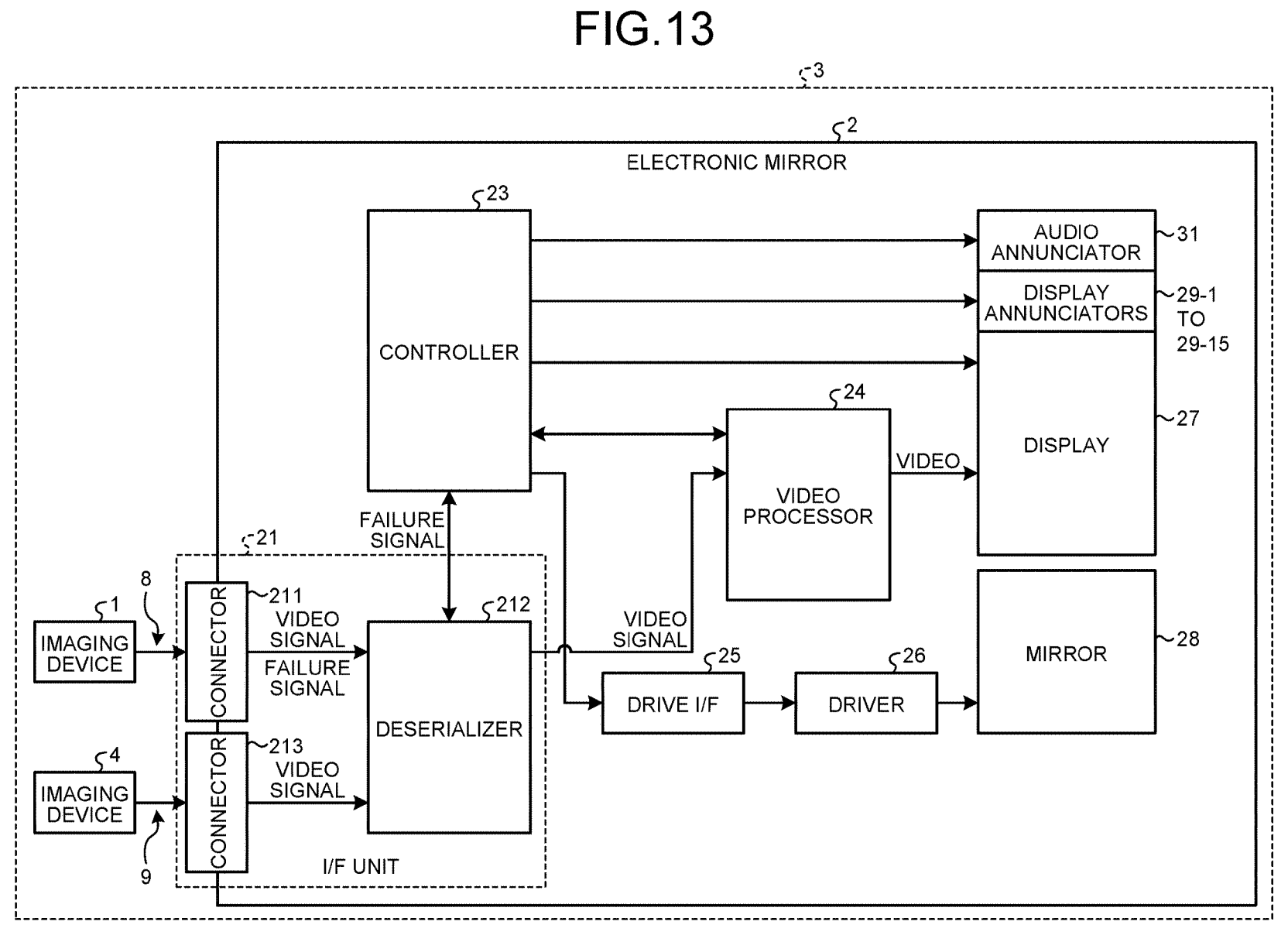

In the electronic mirror 2, as illustrated in FIG. 13, the interface unit 21 further includes a connector 213 in addition to the connector 211, and the imaging device 4 is connected to the connector 213 via the communication medium 9.

In the initial state, the interface unit 21 establishes a communication connection with the imaging device 1 via the communication medium 8 under the control from the controller 23. Once the communication connection is established, the interface unit 21 performs the interface operations in the communication between the imaging device 1 and the controller 23. At this time, the interface unit 21 disconnects the communication connection with the imaging device 4 via the communication medium 9 under the control from the controller 23. Thus, the electronic mirror 2 operates in the main connection state.

If the controller 23 receives a failure signal, the controller 23 identifies whether the failure of the imaging device 1 is occurring, according to the failure signal. The controller 23 can switch the connection state from the main connection state to the auxiliary connection state according to whether the failure is occurring. The controller 23 may identify the type of the failure in addition to whether the failure of the imaging device 1 is occurring, according to the failure signal. The controller 23 can switch the connection state from the main connection state to the auxiliary connection state according to whether the failure is occurring and the type of the failure. The controller 23 may identify the level of the failure in addition to whether the failure of the imaging device 1 is occurring and the type of the failure, according to the failure signal. The controller 23 can switch the connection state from the main connection state to the auxiliary connection state according to whether the failure is occurring, the type of the failure, and level of the failure.

If the controller 23 instructs the interface unit 21 to switch the connection state from the main connection state to the auxiliary connection state, the interface unit 21 disconnects the communication connection with the imaging device 1 via the communication medium 8 and establishes the communication connection with the imaging device 4 via the communication medium 9 in response to the instruction. Once the communication connection is established, the interface unit 21 performs interface operations in the communication between the imaging device 4 and the controller 23. As a result, the electronic mirror 2 operates in the auxiliary connection state.

Figure 14:
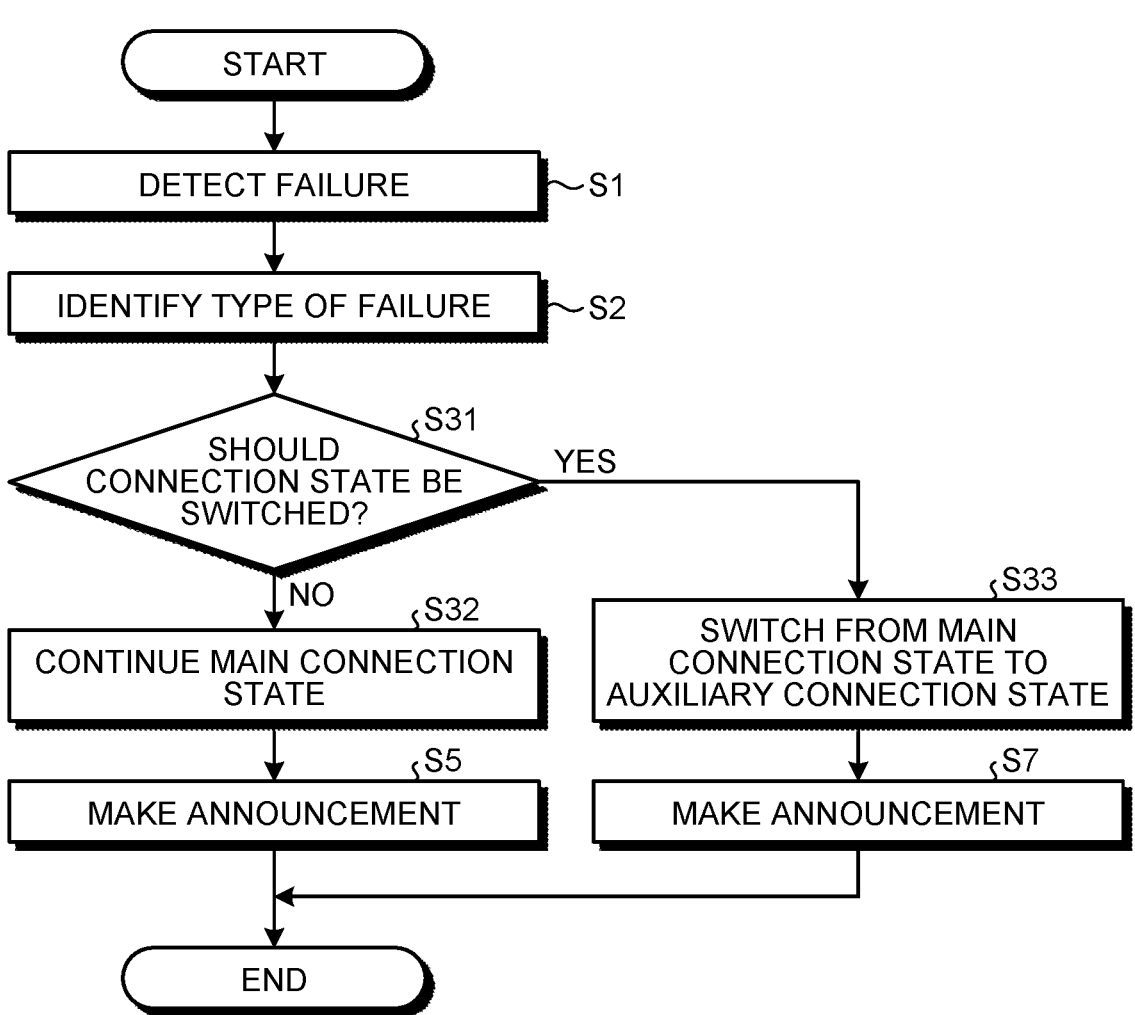
FIG. 14 is a flowchart illustrating an operation of the electronic mirror system in the sixth embodiment.

The switching from the main connection state to the auxiliary connection state can be performed as illustrated in FIG. 14. FIG. 14 is a flowchart illustrating an operation of the electronic mirror system 3.

In the electronic mirror system 3, if the imaging device 1 detects a failure (S1), the imaging device 1 notifies the electronic mirror 2 of the failure. The imaging device 1 may detect the type of the failure in addition to whether the failure is occurring, generate a failure signal indicating the type of the failure, and notify the electronic mirror 2 of the failure signal.

In the electronic mirror 2, after the controller 23 is notified of the failure, the controller 23 identifies whether the failure is occurring and the type of the failure (S2). After the controller 23 receives the failure signal, the controller 23 identifies whether the failure indicated by the failure signal is occurring and the type of the failure. According to whether the failure is occurring and the type of the failure, the controller 23 determines whether to switch the connection state from the main connection state to the auxiliary connection state (S31). The controller 23 may determine whether to switch the connection state from the main connection state to the auxiliary connection state according to whether a failure indicated by each of a plurality of failure signals is occurring and the type of the failure.

For example, if the failure signal indicates the failure identifier FM1 (refer to FIG. 4), the controller 23 determines that the failure mode "frame rate drop" is occurring, but this failure is a failure that allows the main connection state to be continued.

If the failure signal indicates the failure identifier FM2, the controller 23 determines that the failure mode "abnormal video transmission" is occurring, and this failure is a failure indicating that the main connection state should not be continued.

If the failure signal indicates the failure identifier FM6, the controller 23 determines that the failure mode "sensitivity abnormality" is occurring, and this failure is a failure indicating that the main connection state should not be continued.

If the failure signal indicates the failure identifier FM7, the controller 23 determines that the failure mode "dynamic range abnormality" is occurring, and this failure is a failure indicating that the main connection state should not be continued.

If the failure signal indicates the failure identifier FM8, the controller 23 determines that the failure mode "linearity abnormality" is occurring, and this failure is a failure indicating that the main connection state should not be continued.

If the failure signal indicates the failure identifier FM13, the controller 23 determines that the failure mode "display position deviation" is occurring, and this failure is a failure indicating that the main connection state should not be continued.

If the failure signal indicates the failure identifier FM14, the controller 23 determines that the failure mode "image sticking" is occurring, and this failure is a failure indicating that the main connection state should not be continued.

If the failure signal indicates the failure identifier FM15, the controller 23 determines that the failure mode "left-right inversion abnormality" is occurring, and this failure is a failure indicating that the main connection state should not be continued.

If failures indicated by a plurality of failure signals include a failure indicating that the main connection state should not be continued, the controller 23 determines that the connection state should be switched. If each of the failures indicated by the failure signals is a failure that allows the main connection state to be continued, or is indicated as NULL (no failure), the controller 23 determines that the connection state should not be switched. If all the failure signals indicate NULL, the controller 23 determines that no failure is occurring, and the connection state should not be switched.

If the connection state should not be switched (No at S31), the controller 23 continues the main connection state as the operating state of the electronic mirror 2 (S32), and announces the information on the failure using at least one of display and audio (S5).

If the connection state should be switched (Yes at S31), the controller 23 switches the connection state of the electronic mirror 2 from the main connection state to the auxiliary connection state as the operating state of the electronic mirror 2 (S33). That is, the controller 23 instructs the interface unit 21 to switch the connection state from the main connection state to the auxiliary connection state. After the interface unit 21 receives the instruction from the controller 23 to switch the connection state from the main connection state to the auxiliary connection state, the interface unit 21 disconnects the communication connection with the imaging device 1 via the communication medium 8 and establishes the communication connection with the imaging device 4 via the communication medium 9 in response to the instruction. The controller 23 then announces the information on the failure using at least one of display and audio (S7).

As described above, in the sixth embodiment, the electronic mirror system 3 can switch the electronic mirror 2 from the main connection state to the auxiliary connection state in response to a failure detected in the imaging device 1. As a result, the connection partner of the electronic mirror 2 can be switched from the imaging device 1 to the other imaging device 4, and thus, the convenience of the electronic mirror system 3 can be further improved.

Seventh Embodiment

The following describes the electronic mirror system according to a seventh embodiment. The following description focuses on differences from the first to the sixth embodiments.

In the seventh embodiment, an operation of returning from the auxiliary connection state to the main connection state will be described as an operation after the switching from the main connection state to the auxiliary connection state.

Figure 15:
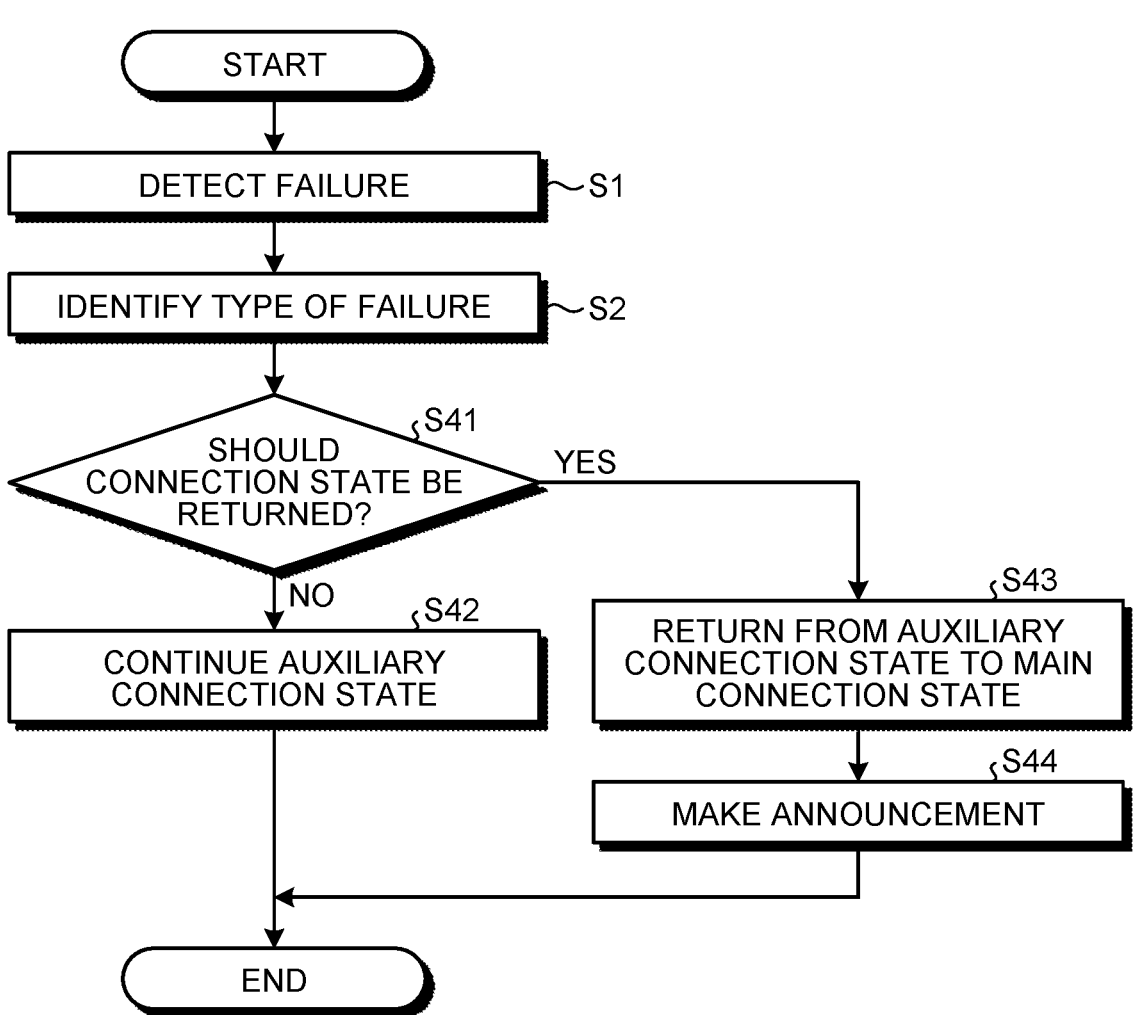
FIG. 15 is a flowchart illustrating an operation of the electronic mirror system in a seventh embodiment.

Specifically, in the return from the auxiliary connection state to the main connection state, processes different from those of the sixth embodiment in the following respects can be performed as illustrated in FIG. 15. FIG. 15 is a flowchart illustrating an operation of the electronic mirror system 3.

According to whether a failure is occurring and the type of the failure, the controller 23 determines whether to return the connection state from the auxiliary connection state to the main connection state (S41). For example, if failures indicated by a plurality of failure signals include a failure indicating that the main connection state should not be continued, the controller 23 determines not to return the connection state. If each of the failures indicated by the failure signals is a failure that allows the main connection state to be continued, or is indicated as NULL (no failure), the controller 23 determines that the connection state should be returned. If all the failure signals indicate NULL, the controller 23 determines that no failure is occurring, and the connection state should be returned.

If the connection state should not be returned (No at S41), the controller 23 continues the auxiliary connection state as the operating state of the electronic mirror 2 (S42).

If the connection state should be returned (Yes at S41), the controller 23 returns the connection state from the auxiliary connection state to the main connection state as the operating state of the electronic mirror 2 (S43). That is, the controller 23 instructs the interface unit 21 to switch the connection state from the auxiliary connection state to the main connection state. After the interface unit 21 receives the instruction from the controller 23 to switch the connection state from the auxiliary connection state to the main connection state, the interface unit 21 disconnects the communication connection with the imaging device 4 via the communication medium 9 and establishes the communication connection with the imaging device 1 via the communication medium 8 in response to the instruction.

The controller 23 then announces the information on the return of the connection state from the auxiliary connection state to the main connection state using at least one of display and audio (S44). For example, the controller 23 may announce the return by turning off all the display annunciators 29-1 to 29-15. The controller 23 may announce the return by causing the audio annunciator 31 (refer to FIG. 2) to output the alarm sound or the message sound. The controller 23 may announce the return by displaying a message on the screen of the display 27 (refer to FIG. 2).

As described above, in the seventh embodiment, the electronic mirror system 3 can return the operation of the electronic mirror 2 from the auxiliary connection state to the main connection state according to whether a failure of the imaging device 1 is occurring and the type of the failure. For example, the operation of the electronic mirror 2 can be returned from the auxiliary connection state to the main connection state if the failure of the imaging device 1 is a temporary failure, or if the imaging device 1 has been replaced with a repaired imaging device or another imaging device. This feature can further improve the convenience of the electronic mirror system 3.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic mirror system comprising:
a first imaging device configured to acquire a first image; and
an electronic mirror configured to be in a display mode and in a mirror mode, the electronic mirror displays the first image acquired by the first imaging device in the display mode, the electronic mirror serves as a mirror in the mirror mode, wherein
the first imaging device comprises:
a detector configured to detect a failure;
a notifier configured to notify the electronic mirror of the detected failure, the electronic mirror comprises:
an annunciator configured to announce information on the detected failure; and
a controller configured to switch the electronic mirror from the display mode to the mirror mode according to whether the detected failure has occurred, a type of the detected failure, and a level of the detected failure,
the controller is configured to:
determine the type of the detected failure is a frame rate drop; and
determine the level of the detected failure is the frame rate drop at a first level;
in response to determining the type of the detected failure is the frame rate drop and the level of the detected failure is the frame rate drop at the first level, (1) the controller restricts switching the electronic mirror from the display mode to the mirror mode, and (2) the annunciator announces first information for the detected failure being the frame rate drop at the first level, the first information indicating that the type of the detected failure is the frame rate drop,
the controller is configured to further determine the level of the detected failure is the frame rate drop at a second level higher than the first level, and
in response to determining the type of the detected failure is the frame rate drop and the level of the detected failure is the frame rate drop at the second level, (1) the controller switches the electronic mirror from the display mode to the mirror mode, and (2) the annunciator announces second information for the detected failure being the frame rate drop at the second level, the second information indicating that the type of the detected failure is the frame rate drop.

2. The electronic mirror system according to claim 1, wherein
the detector is configured to generate a failure signal capable of identifying the type of the detected failure,
the notifier is configured to notify the generated failure signal, and
the annunciator is configured to announce the information in a form capable of identifying the type of the detected failure according to the generated failure signal.

3. The electronic mirror system according to claim 1, wherein
the first imaging device further comprises an image sensor and a signal processor, and
the detector comprises:
a first detector configured to detect a failure of the image sensor; and
a second detector configured to detect a failure of the signal processor.

4. The electronic mirror system according to claim 3, wherein
the image sensor comprises a first terminal configured to output a pixel signal and a second terminal configured to output a signal indicating the failure of the image sensor, and
the signal processor comprises a third terminal configured to output a processed signal and a fourth terminal configured to output a signal indicating the failure of the signal processor.

5. The electronic mirror system according to claim 1, wherein the annunciator is configured to announce the information by using at least one of audio and display.

6. The electronic mirror system according to claim 1, further comprising a second imaging device, wherein the controller is configured to switch between a first state in which the first image acquired by the first imaging device is displayed and a second state in which a second image acquired by the second imaging device is displayed, according to the detected failure.

7. The electronic mirror system according to claim 6, wherein the controller is configured to switch between the first state and the second state according to the type of the detected failure.

8. The electronic mirror system according to claim 6, wherein the controller is configured to switch between the first state and the second state according to the type and the level of the detected failure.

9. An imaging device comprising:

an image sensor configured to acquire an image;

a detector configured to detect a failure; and a notifier capable of notifying an electronic mirror of the detected failure, the electronic mirror including:

an annunciator configured to announce information on the detected failure; and a controller configured to switch the electronic mirror from a display mode to a mirror mode according to whether the detected failure has occurred, a type of the detected failure, and a level of the detected failure, the electronic mirror displays the image acquired by the imaging sensor in the display mode, the electronic mirror serves as a mirror in the mirror mode, wherein the controller is configured to:

determine the type of the detected failure is a frame rate drop; and determine the level of the detected failure is the frame rate drop at a first level, in response to determining the type of the detected failure is the frame rate drop and the level of the detected failure is the frame rate drop at the first level, (1) the controller restricts switching the electronic mirror from the display mode to the mirror mode, and (2) the annunciator announces first information for the detected failure being the frame rate drop at the first level, the first information indicating that the type of the detected failure is the frame rate drop, the controller is configured to further determine the level of the detected failure is the frame rate drop at a second level higher than the first level, and in response to determining the type of the detected failure is the frame rate drop and the level of the detected failure is the frame rate drop at the second level, (1) the controller switches the electronic mirror from the display mode to the mirror mode, and (2) the annunciator announces second information for the detected failure being the frame rate drop at the second level, the second information indicating that the type of the detected failure is the frame rate drop.

10. The imaging device according to claim 9, wherein the detector is configured to generate a failure signal capable of identifying the type of the detected failure, and the notifier is configured to notify the generated failure signal.

11. The imaging device according to claim 9, further comprising a signal processor, wherein the detector comprises:

a first detector configured to detect a failure of the image sensor; and a second detector configured to detect a failure of the signal processor.

12. The imaging device according to claim 11, wherein the image sensor comprises a first terminal configured to output a pixel signal and a second terminal configured to output a signal indicating the failure of the image sensor, and the signal processor comprises a third terminal configured to output a processed signal and a fourth terminal configured to output a signal indicating the failure of the signal processor.

13. An electronic mirror comprising:

a connector connectable to an imaging device configured to acquire an image, the imaging device including:

a detector configured to detect a failure; and a notifier configured to notify the electronic mirror of the detected failure via the connector; and an annunciator configured to announce information on the detected failure; and a controller configured to switch the electronic mirror from a display mode to a mirror mode according to whether the detected failure has occurred, a type of the detected failure, and a level of the detected failure, the electronic mirror displays the image acquired by the imaging device in the display mode, the electronic mirror serves as a mirror in the mirror mode, wherein the controller is configured to:

determine the type of the detected failure is a frame rate drop; and determine the level of the detected failure is the frame rate drop at a first level, in response to determining the type of the detected failure is the frame rate drop and the level of the detected failure is the frame rate drop at the first level, (1) the controller restricts switching the electronic mirror from the display mode to the mirror mode, and (2) the annunciator announces first information for the detected failure being the frame rate drop at the first level, the first information indicating that the type of the detected failure is the frame rate drop, the controller is configured to further determine the level of the detected failure is the frame rate drop at a second level higher than the first level, and in response to determining the type of the detected failure is the frame rate drop and the level of the detected failure is the frame rate drop at the second level, (1) the controller switches the electronic mirror from the display mode to the mirror mode, and (2) the annunciator announces second information for the detected failure being the frame rate drop at the second level, the second information indicating that the type of the detected failure is the frame rate drop.

14. The electronic mirror according to claim 13, wherein the annunciator is configured to announce the information by using at least one of audio and display.

15. The electronic mirror system according to claim 1, wherein the controller switches the electronic mirror from the display mode to the mirror mode in case the type of the detected failure is an abnormal video transmission, a sensitivity abnormality, a dynamic range abnormality, a linearity abnormality, a display position deviation, an image sticking, or a left-right inversion abnormality.

* * * * *